US012393794B2

(12) United States Patent
Garg et al.

(10) Patent No.: US 12,393,794 B2
(45) Date of Patent: Aug. 19, 2025

(54) VIDEO TRANSLATION PLATFORM

(71) Applicant: ACCENTURE GLOBAL SOLUTIONS LIMITED, Dublin (IE)

(72) Inventors: Ankur Garg, Gurgaon (IN); Rani Gopalakrishnan, Bangalore (IN); Shailesh Chaphekar, Mumbai (IN); Deepa Dharmit Shah, Mumbai (IN); Vipin Bhasin, Pune (IN); Pallav Chourey, Pradesh (IN); Suraj Khaitan, Titlagarh (IN); Anagha Avinash Ghate, Amaravati (IN); Kumar Vaibhav, Noida (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 421 days.

(21) Appl. No.: 17/851,961

(22) Filed: Jun. 28, 2022

(65) Prior Publication Data

US 2023/0325611 A1    Oct. 12, 2023

(30) Foreign Application Priority Data

Apr. 8, 2022  (IN) .............................. 202211021128
Apr. 21, 2022 (IN) .............................. 202211023590

(51) Int. Cl.
  *G06F 40/58*   (2020.01)
  *G06V 30/19*   (2022.01)
  *G10L 15/26*   (2006.01)

(52) U.S. Cl.
  CPC ........ *G06F 40/58* (2020.01); *G06V 30/19167* (2022.01); *G10L 15/26* (2013.01)

(58) Field of Classification Search
  None
  See application file for complete search history.

(56) References Cited

U.S. PATENT DOCUMENTS 7,117,231 B2 * 10/2006 Fischer ................ H04N 21/235
                                                707/999.203
2016/0179831 A1 * 6/2016 Gruber .................. G10L 19/018
                                                704/235

(Continued)

FOREIGN PATENT DOCUMENTS

JP    2000322077 A    11/2000
JP    2008065653 A     3/2008

(Continued)

OTHER PUBLICATIONS

Fried et al., "Text-based editing of talking-head video", ACM Trans. Graph, vol. 38, No. 4, 2019 (Year: 2019).*

(Continued)

*Primary Examiner* — Nicole A K Schmieder
(74) *Attorney, Agent, or Firm* — Mannava & Kang, P.C.

(57) ABSTRACT

A video translation system that generates an output video in a target language which includes a translated/output audio track that runs in synchrony with the video content of a received input video in a source language and further displays translated subtitles corresponding to the translated audio track is disclosed. Upon receiving the input video, the domain of the input video can be identified. A translation engine and a transcription engine are selected based on the domain and the pair of languages corresponding to the input video and the output video. The output audio track is generated using the translation engine and merged with a manipulated video, which runs in synchrony with the output audio track to generate the output video. The transcription engine generates subtitles translated from the source language to the target language for the output video.

25 Claims, 17 Drawing Sheets

(56) References Cited

U.S. PATENT DOCUMENTS

| | | | |
|---|---|---|---|
| 2017/0178623 A1* | 6/2017 | Shamir | ............... G10L 15/1822 |
| 2020/0169591 A1* | 5/2020 | Ingel | ........................ G10L 13/08 |
| 2022/0036617 A1 | 2/2022 | Biswas et al. | |
| 2022/0301548 A1* | 9/2022 | Wintrode | .............. G10L 15/083 |

FOREIGN PATENT DOCUMENTS

| | | |
|---|---|---|
| JP | 2008158510 A | 7/2008 |
| JP | 2020034683 A | 3/2020 |
| JP | 2021511534 A | 5/2021 |
| JP | 2022017702 A | 1/2022 |

OTHER PUBLICATIONS

Yadav et al., "A Multilingual Framework of CNN and Bi-LSTM for Emotion Classification", 11th ICCCNT, 2020 (Year: 2020).*

Dale Markowitz, "AI Dubs Over Subs? Translating andDubbing Videos with AI", Feb. 3, 2021, (15 pages).

Unlock A Fresh & High-Quality Traffic Source That 99% Of Your Competition Hasn't Exploited, Google download date Mar. 28, 2022, https://typestudio.co/use-case/translate-video.

https://vidscribe.in/, Google dowload date Mar. 28, 2022.

"Notice of Decision to Grant Japanese Patent Application No. 2023-062296", dated Dec. 24, 2024, 2 pages.

* cited by examiner

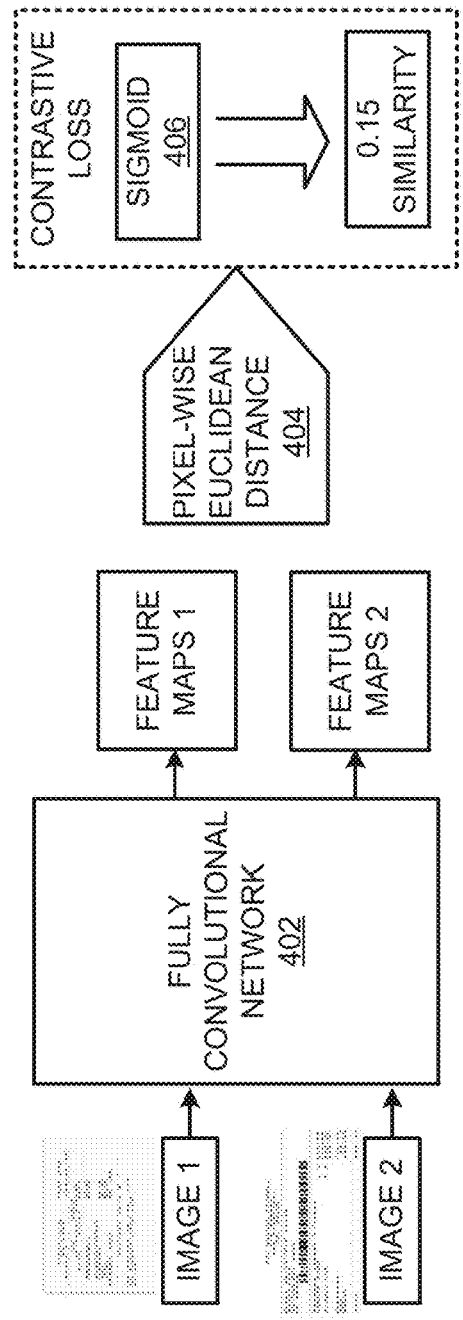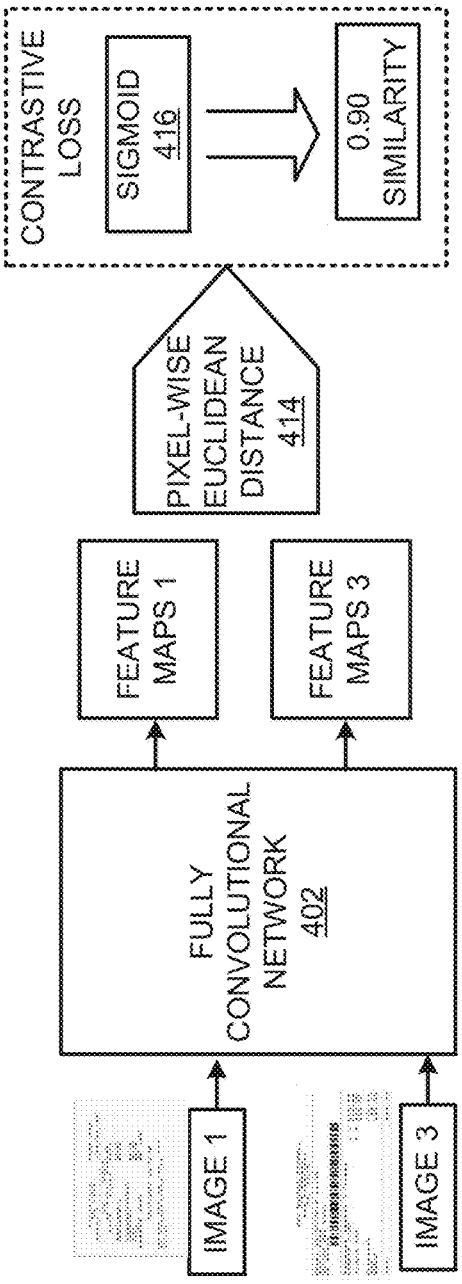

VIDEO TRANSLATION PLATFORM

PRIORITY

The present non-provisional application claims priority to the Indian Provisional Patent Application Serial No. 202211021128, having a filing date of Apr. 8, 2022, and the Indian Provisional Patent Application Serial No. 202211023590, having a filing date of Apr. 21, 2022, the disclosures of which are hereby incorporated by reference in their entireties.

BACKGROUND

Computers have long been used for translating text from one language to another. Automatic or machine translation is one of the important functions enabled by artificial intelligence (AI) technologies. Classically, rule-based systems were used for this task. However, these systems were later replaced with systems using statistical methods. More recently, deep neural network (DNN) models achieve state-of-the-art results in the field of neural machine translation.

BRIEF DESCRIPTION OF DRAWINGS

Features of the present disclosure are illustrated by way of examples shown in the following figures. In the following figures, like numerals indicate like elements, in which:

FIGS. 4A and 4B illustrate the duplication of video frames in accordance with the examples disclosed herein.

DETAILED DESCRIPTION

Figure 1A:
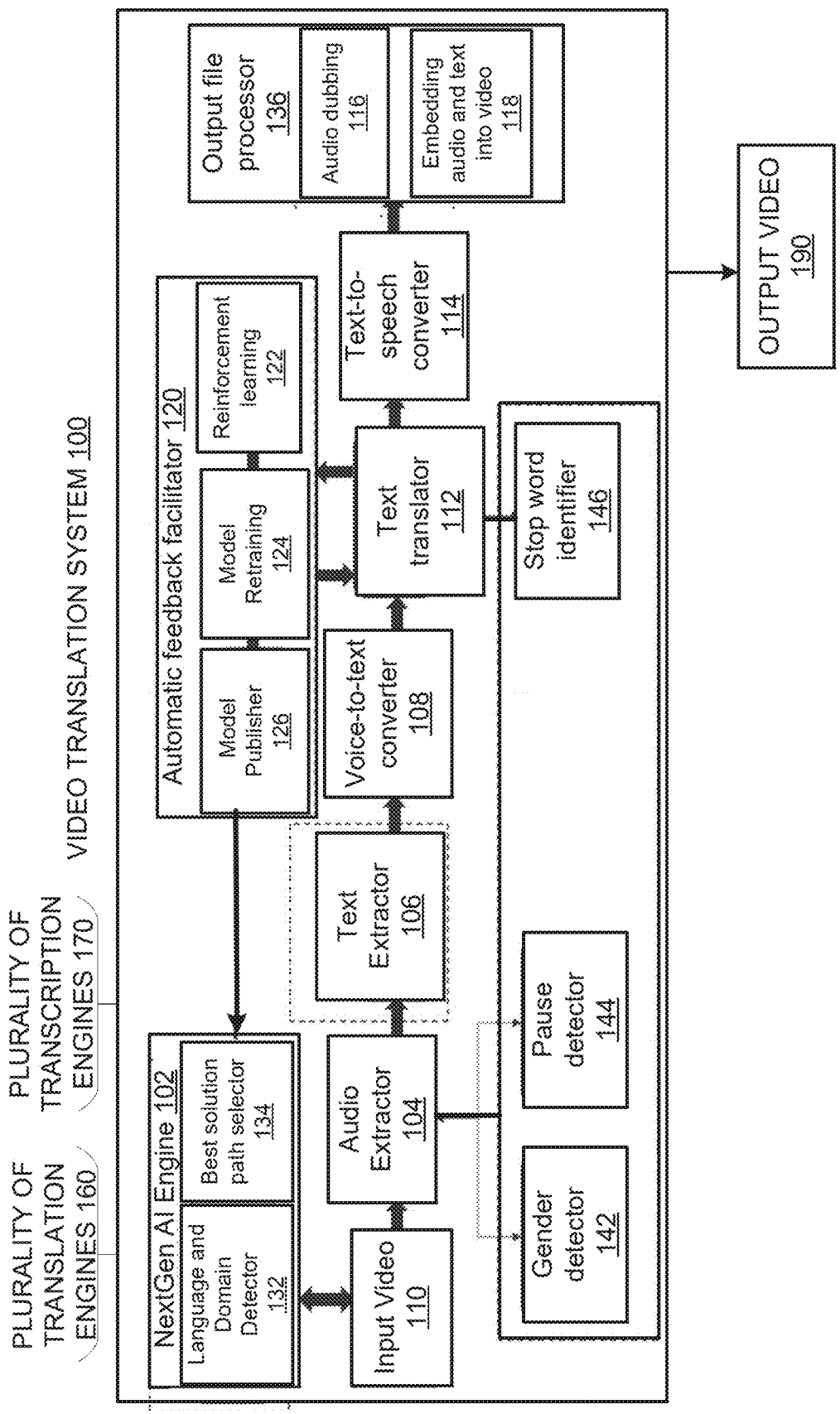
FIG. 1A shows a block diagram of a video translation system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A video translation system that generates an output video corresponding to a translated version of a received input video is disclosed. The input video may be received along with a selection of a target language into which it is to be translated. In an example, the input video may include an audio track in an input language/source language while the output video may be generated in an output language/target language. When the input video is received, a NextGen AI engine identifies a domain of the input video. Based at least on the domain, the source language, and target language, the NextGen AI engine can recommend a solution path that may include the best translation engine, transcription engine, and an Optical Character Recognition (OCR) engine for the identified domain and the source/target language pair that can provide the highest translation accuracy. The translation engine and the transcription engine can be selected so that they provide the highest accuracy for the translation/transcription tasks from amongst the available options.

The input audio track is extracted from the input video and used for gender detection wherein the gender of the different voices speaking in the input audio track are identified by gender detection models. In an example, if the input audio track includes different voices of the same gender, then such differentiation may also be identified by the gender detection models. In addition, the pauses and the stop words occurring in the extracted input audio track are also identified. The meaningful text which may be present in different frames of the input video may also be extracted. Further, the selected transcription engine transcribes the input audio track to produce the transcribed text of the audio input. The transcribed text and the text extracted from the frames of the input video can be provided to the translation engine to obtain textual output translated into the target language. This textual output can be converted to speech to produce a voice output in the target language. In an example, the audio signals of the voice output may be divided into homogenous zones of speech that make up voice segments which can be further processed to generate an output audio track.

A speed coefficient is calculated for the voice output and one or more of the voice output and the input video may be manipulated or transformed if needed using different methods described herein so that they are in synchrony. In an example, pauses can be inserted into the voice output to generate an output audio track. In an example, the voice output may be used unmodified as the output audio track. In an example, the video content of the input video can be modified via the insertion of new video frames that are automatically generated using Generative Adversarial Networks (GANs). The images of speakers in the input video can also be modified so that the lip movements of the speakers in the images are synchronous with the output video track. The output video is generated by merging the output audio track with the modified video content. User feedback can be collected and automatically incorporated via reinforcement learning, to improve the machine learning (ML) models used for the domain identification, the translation, and the transcription engine selections.

The server-less, real-time, online video translation solution disclosed herein includes an interactive user interface to translate video content at the click of a button. The video translation system uses automation and Artificial Intelligence (AI) to transcribe a video and then translate the input audio track in the source language to the target language in order to make it suitable for multilingual audiences. The translated script generated from the transcribed input audio track can then be converted back to a translated audio and embedded with the video content to generate the output video. The video translation is enabled by features such as but not limited to custom/domain-specific glossaries, expert reviews, extraction of in-video content, a smart nextgen AI, auto-learning based on feedback from experts, and a security layer for protecting content and distribution. In an example, the video translation system can be made available as a Software as a Service (SaaS) solution to benefit from, at scale and pay-per-use. The video translation system described herein is available for translation 24×7 and delivers translation at high speed and very low cost as the majority of the translation/transcription work is automated.

FIG. 1 shows a diagram of a video translation system 100 in accordance with the examples disclosed herein. An input video 110 is received by the video translation system 100 which translates the audio and the textual content in the input video 110 to an output/target language and generates an output video 190. In an example, the input video 110 can include an input audio track and/or textual content in one or more input/source languages. The output video 190, would therefore include one or more of an output audio track in the target language and textual content translated from the source language into the target language. In an example, the translated textual content can be provided as subtitles in the output video 190. Furthermore, the output video 190, would also include video content manipulated or altered to suit the target language. In an example, the choice for the target languages can be provided with the input video 110 via a user interface. The input video 110 may be associated with a domain selected from a plurality of domains such as but not limited to healthcare, finance, education, management, scientific topics, entertainment content, etc.

When the input video 110 is received, the NextGen AI engine 102 activates the language and domain detector 132 to detect the source language and the domain associated with the input video 110. Based at least on the source language/target language combination and the domain associated with the input video 110, the best solution path selector 134 of the NextGen AI engine 102 can provide recommendation for the best solution path that includes a unique combination of a translation engine selected from a plurality of translation engines 160 and a transcription engine selected from a plurality of transcription engines 170 for carrying out the automated translation and transcription tasks. The selection of the translation engine can be based on the accuracy of the translation engine for the translation of the particular source/target language pair and the domain associated with the input video 110. Similarly, the transcription service may also be selected based on the accuracies of the plurality of transcription engines 170 for the particular source language and the domain associated with the input video 110. In an example, the NextGen AI engine 102 may provide an option that allows users to override the automatic selections of the translation and transcription engines to manually select the transcription/translation engines.

Upon identifying the optimal translation and transcription engines to be employed for the generation of the output video 190, the input audio track is extracted by the audio extractor 104. The input audio track may be stored as an audio file in formats such as .mp3, wav, etc. The audio extractor 104 can further include or be coupled to a gender detector 142, a pause detector 144, and a stop word identifier 146. The gender detector 142 identifies different portions of the input audio track in the input video 110 as being spoken by different speakers. The gender detector 142 enables producing the translated audio output in the appropriate machine-generated voice. The pause detector 144 identifies pauses in the input audio track. Identification of pauses in the input video 110 enables accurately synchronizing the appearance of translated subtitles with the corresponding audio in the output video 190. The stop word identifier 146, further identifies different stop words occurring in the audio input of the input video 110. Different languages may have different stop words and identification of such stop words, enables breaking off the subtitles in synchrony with the audio component of the output video 190, so that meaningful subtitles can be displayed.

The input video 110 is then processed for text extraction by the text extractor 106. In an example, the input video 110 can include certain portions with textual content in the source language which may be important for a viewer to understand in order to follow the proceedings of the input video 110. The text extractor 106 from the input video 110 may involve analyzing the frames of the input video 110 to identify those frames with meaningful textual content. Optical character recognition (OCR), may then be applied to those frames for text extraction. Automatic identification of the frames with meaningful textual content can involve certain thresholds such as the extent of textual content in a given frame so that processing resources are not wasted in translating or transcribing irrelevant content. The selected transcription service is employed by a voice-to-text converter 108 for generating textual form or a transcription of the input audio track extracted from the input video 110. The transcription from the voice-to-text converter 108 may be provided in the source language to the text translator 112 which translates the transcription to the target language using the translation service selected by the NextGen AI engine 102. In an example, the textual inputs to the textual translator 112 may also include the source language textual output/meaningful text obtained from the selected frames by the text extractor 106. The text translator 112, therefore, produces translated textual content in the target language not only for the input audio track but also for the meaningful textual content identified and extracted from the input video frames. The text-to-speech converter 114 produces a voice output in the target language corresponding to the translated textual content obtained from the textual translator 112. The voice output can include multiple voice segments or portions that may pertain to different speakers who may or may not be of different genders associated with the different portions. Accordingly, the voice output can be produced automatically in the corresponding gender by the audio dubbing 116 using voice-to-text synthesizers executed by an output file processor 136. In an example, the text-to-speech converter 114 uses the output from the gender detector 142 for audio dubbing 116 to generate a gender-specific output audio track in the target language. In an example, even if different speakers are identified as the same gender, different voices/tones may be used for their voice segments. The output file processor 136 alters or manipulates the video content of the input video 110 to be synchronous with the output audio track. The one or more segments of the audio track are embedded 118 with the altered video content to generate the output video 190.

The video translation system 100 includes an automatic feedback facilitator 120 for improving the various AI models used throughout the translation pipeline. Feedback given by users and language experts can be automatically incorporated using reinforcement learning 122. In an example, feedback may be automatically incorporated via model retraining 124 and glossary updates. Based at least on certain model efficiency thresholds, it may be determined by the model publisher 126 whether the retrained models should be published to the translation pipeline. In an example, feedback obtained may be used to update the solution paths of the NextGen AI engine 102 for the transcription/translation service selection and the input video domain identification.

Figure 1B:
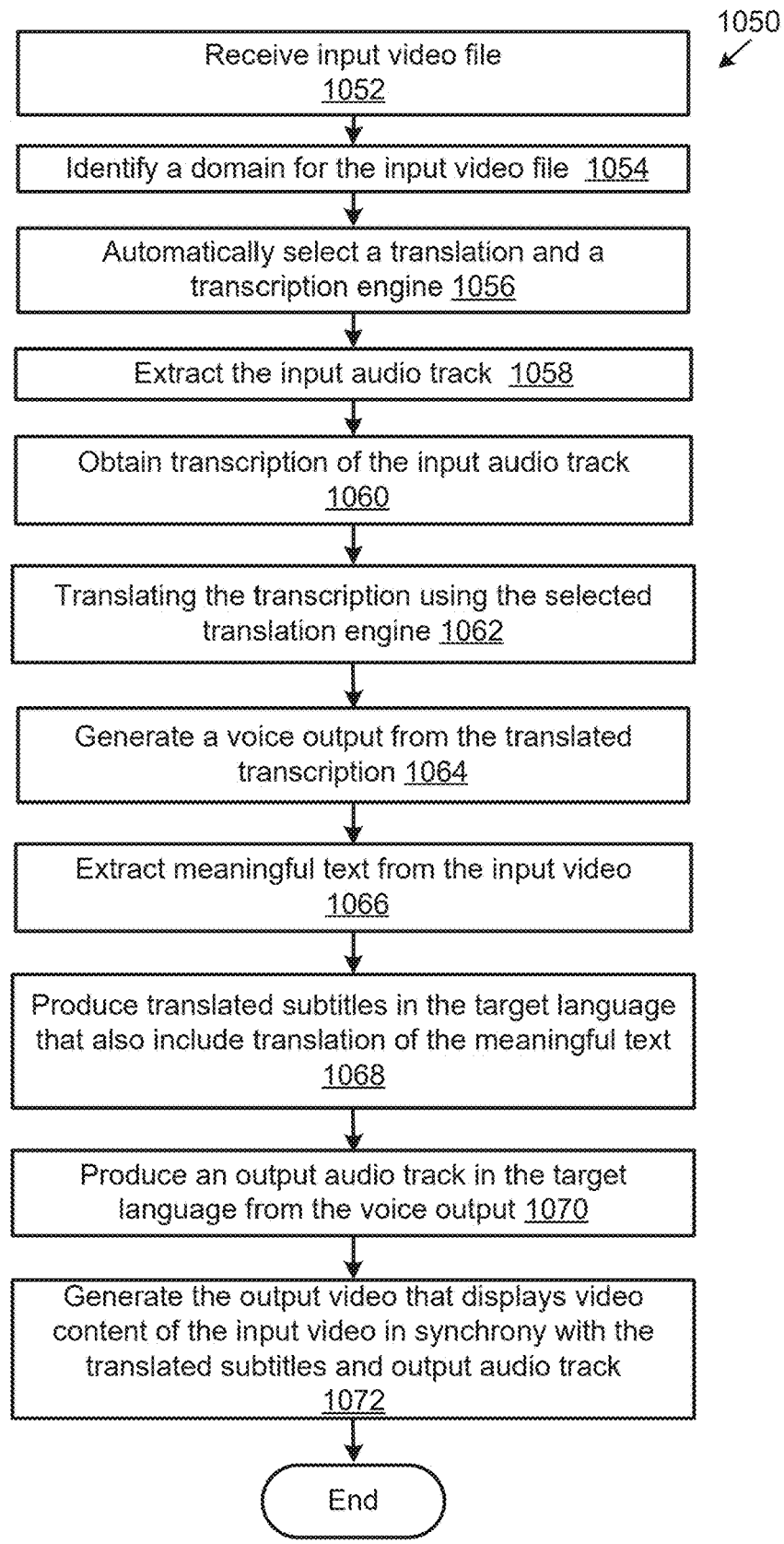
FIG. 1B shows a flowchart that shows a method of translating the input video into a target language in accordance with the examples disclosed herein.

FIG. 1B shows a flowchart 1050 that shows a method of translating the input video 110 into a target language in accordance with the examples disclosed herein. The method begins at 1052 with the video translation system 100 receiving the input video 110 along with its metadata. In an example, the metadata can include at least the source language of the input audio track accompanying the input video 110 and the target language into which the input video is to be translated, and optionally any keywords associated with the input video 110. At 1054, a domain associated with the input video 110 is identified by the NextGen AI engine 102. The keywords associated with the input video 110 in its accompanying metadata or if no keywords are associated then, keywords extracted from the input audio track can be used to create a probability scorecard against the plurality of predefined domains. In an example, the Naïve Bayes method can be employed for creating the probability scorecard. One of the plurality of predefined domains with the highest probability can be output as the domain of the input video at 1054.

The identified domain along with the pair of source and target languages can be used, to automatically select a translation engine from the plurality of translation engines 160 and a transcription engine from the plurality of transcription engines 170 at 1056. Furthermore, an optical character recognition (OCR) engine can also be employed for extracting textual content displayed in the input video 110. Accordingly, multiple solution paths with various combinations of the OCR engines that can extract textual content in the source language from the input video 110, the plurality of translation engines 160, and the plurality of transcription engines 170 are generated. The different solution paths can be scored based on the accuracy provided by the particular combination of the OCR engine, the translation engine, and the transcription engine. The solution path with the highest score indicative of the highest accuracy is output at 1056 as the automatic selection.

At 1058, the input audio track is extracted. In addition, various techniques are employed for gender detection, pause detection, and stop word identification. In an example, a dataset can be prepared for several languages, wherein for each language, the dataset contains sample audio clips of different people speaking in different accents, tones, and styles. The audio samples can be converted into Mel-spectrograms that are used to train a gender detection model which includes a deep learning-based convolution neural network (CNN) with long short-term memory (LSTM). The dataset can be divided into a training set, a test set and a validation set for testing and validating the gender detection model. In an example, CNN-based audio segmentation can be implemented to detect the gender in the input audio track. The CNN can be trained to split audio signals into homogeneous zones of speech i.e., voice segments which are then classified based on gender.

Different languages can include different stop words. Accordingly, the dataset can also include samples for training different machine learning (ML) models such as classifiers for stop word identification in different languages. When the source language is identified, the classifiers for stop word identification of the source language can be employed. Identification of stop words further enables detecting pauses in the input audio track. The pauses can also be marked based on the start and end times of the subtitles (if any) in the input video 110. Transcription of the input audio track is obtained using the selected transcription engine at 1060 in the source language. The transcription is translated into the target language using the selected translation engine at 1062 and voice output can be produced from the translated transcription at 1064.

Furthermore, meaningful textual content displayed in the source language in the input video 110 is also extracted 1066. As detailed herein, frames with textual content can be initially identified from the input video 110 by extracting features and using contour detection techniques. Frames with predominant textual content are identified based on a predetermined area of textual content within the frame. Multiple frames with the same textual content are de-duplicated for the extraction of meaningful text.

The translated subtitles are generated at 1068 by translating the transcription of the input audio track and the meaningful text extracted from the input video 110 into the target language using the selected translation engine. An output audio track in the target language is produced at 1070 from the voice output. The output video 190 that displays the video content of the input video 110 in synchrony with the translated subtitles and the output audio track is generated at 1072.

Figure 2A:
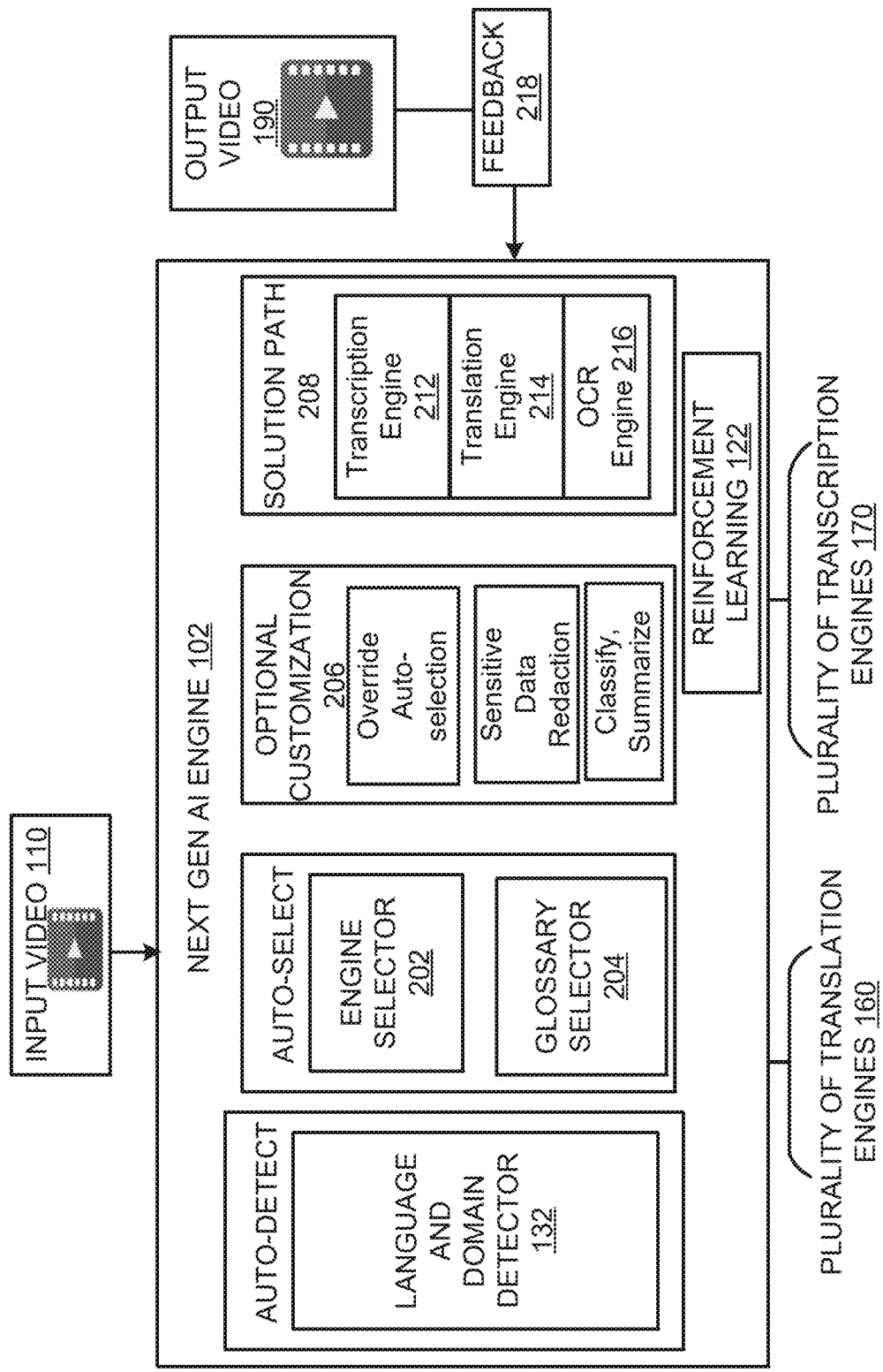
FIG. 2A shows a block diagram of a NextGen AI engine in accordance with the examples disclosed herein.

FIG. 2A shows a block diagram of the NextGen AI engine 102 in accordance with the examples disclosed herein. When the input video 110 is received, various deep learning models included in the NextGen AI engine 102 can be employed for automatic detection of the language, domain of the input video 110, and gender of the speakers in different frames of the input video 110. The translation and transcription services can be selected by the engine selector 202 based on their accuracies for the particular pair of the source/target languages. The glossary selector 204 can select one or more glossaries based on the source/target languages and the particular domain associated with the input video 110. In an example, the selected glossaries may include domain-specific terminologies in the source/target languages. In an example, trained classifiers can be used for the various selections. In an example, the engine selector 202 can implement deep learning models which can be trained on explicitly labeled data for engine selection for particular source-target language pair and domain combinations. The glossary selector 204 can be programmed to select particular glossaries based on the identified domain and the source-target language combination. Optional customizations 206 such as overriding the automatic selections made by the engine selector 202 and/or the glossary selector 204 can be included. Other optional customizations may include sensitive data redaction of the input video 110, classification and summarization of the input video 110, etc. The solution path 208 provided by the NextGen AI engine 102 can include a selection of a transcription engine 212 from the plurality of transcription engines 170, a selection of the translation engine 214 from the plurality of translation engines 160, and an OCR engine 216 for text extraction from the frames of the input video 110. Feedback 218 regarding the selected engines can be obtained after providing the output video 190 and may be incorporated into the NextGen AI engine 102 via reinforcement learning.

The NextGen AI engine 102 includes multiple AI algorithms and cognitive services and intelligently recommends the solution path for any input video based on a domain and language pairs. This intelligence is consistently updated based on the latest learnings and user feedback. Following are the high-level steps executed by the NextGen AI engine 102 when a new video translation request is received:

1) Identify the Language, Domain, and Gender in the video. Language detection can be done using inbuilt cognitive services functionalities while for gender detection, customized voice models such as custom CNNs are developed for different languages.
2) Classification models using the domain-specific word-based embeddings are used for the domain identification.
3) The metadata mapping for this information corresponding to the various parts of the particular video is built.
4) The video can be segregated into multiple parts based on the above-captured metadata.
5) The best OCR engine, transcription engine, and translation engine are identified for the corresponding language and domain pairing which provide the highest accuracy and least data leakage for different parts of the particular video.
6) The most appropriate glossary required for the domain-specific translation is selected by a smart recommendation system of the glossary selector 204 which picks the best glossary for the selected language based on the best possible match for the domain-specific words.
7) The solution path is executed and the step outputs are merged for generating the final video output.
8) The NextGen AI engine 102 recommends the solution path which may provide the most accurate results. This intelligence is constantly updated based on an automatic feedback incorporation mechanism.

Figure 2B:
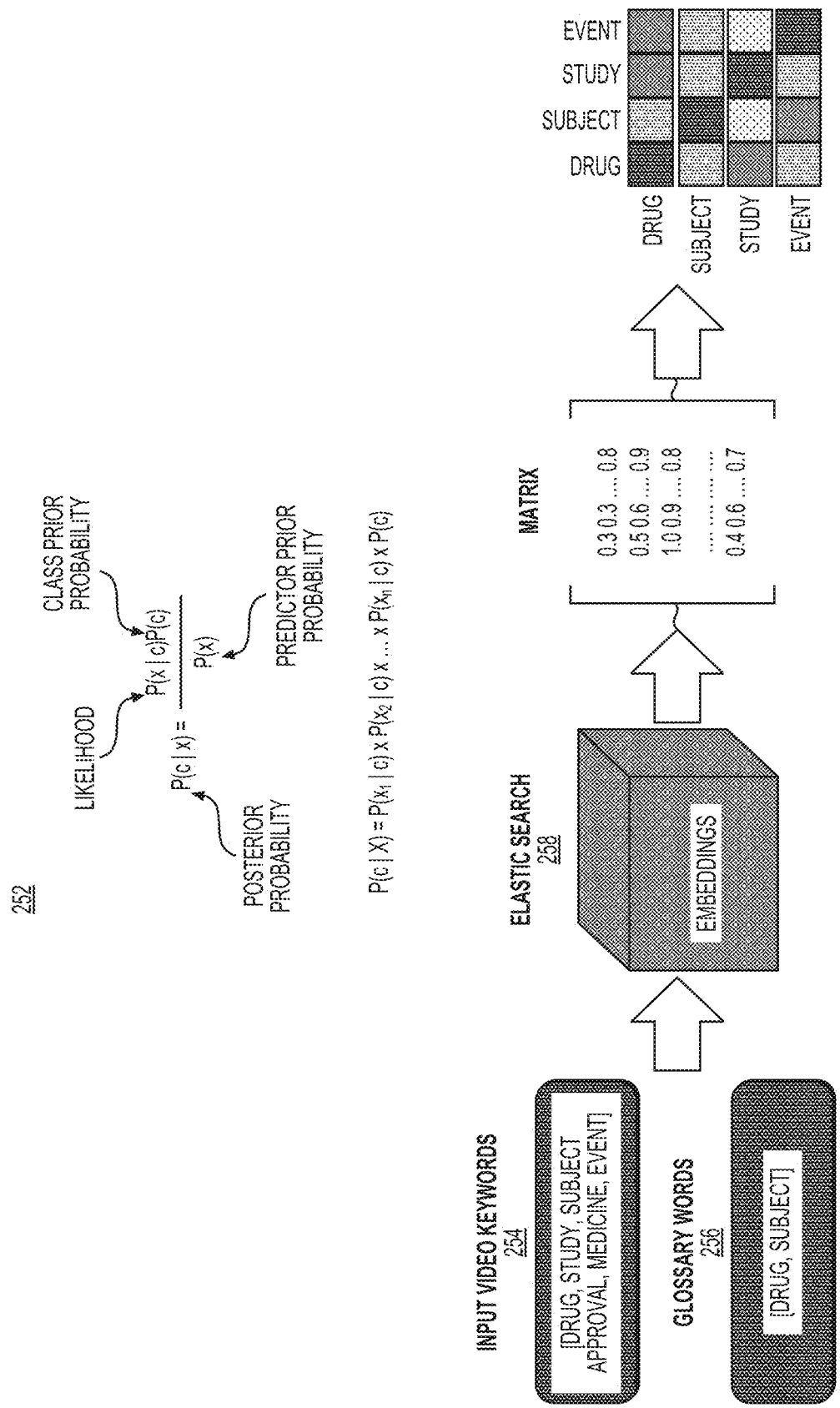
FIG. 2B shows some custom models employed in the NextGen AI engine in accordance with the examples disclosed herein.

FIG. 2B shows some of the custom models employed in the NextGen AI engine 102. The input video keywords 254 along with the glossary words 256 are identified and then a probability scorecard is created against predefined domains. In an example, the keywords 254 and the glossary words 256 can be provided as metadata along with the input video 110. The Naive Bayes algorithm which is represented by equation 252 can be used to create a probability scorecard 260 against predefined domains and the domain with the highest score is recommended. The glossary recommendation is executed based on a semantic web of keywords 254 created from the input video 110 and an elastic search 258 is carried out from the embeddings of the glossaries defined. The best suitable glossary is selected based on the semantic textual similarity 260.

Figure 2C:
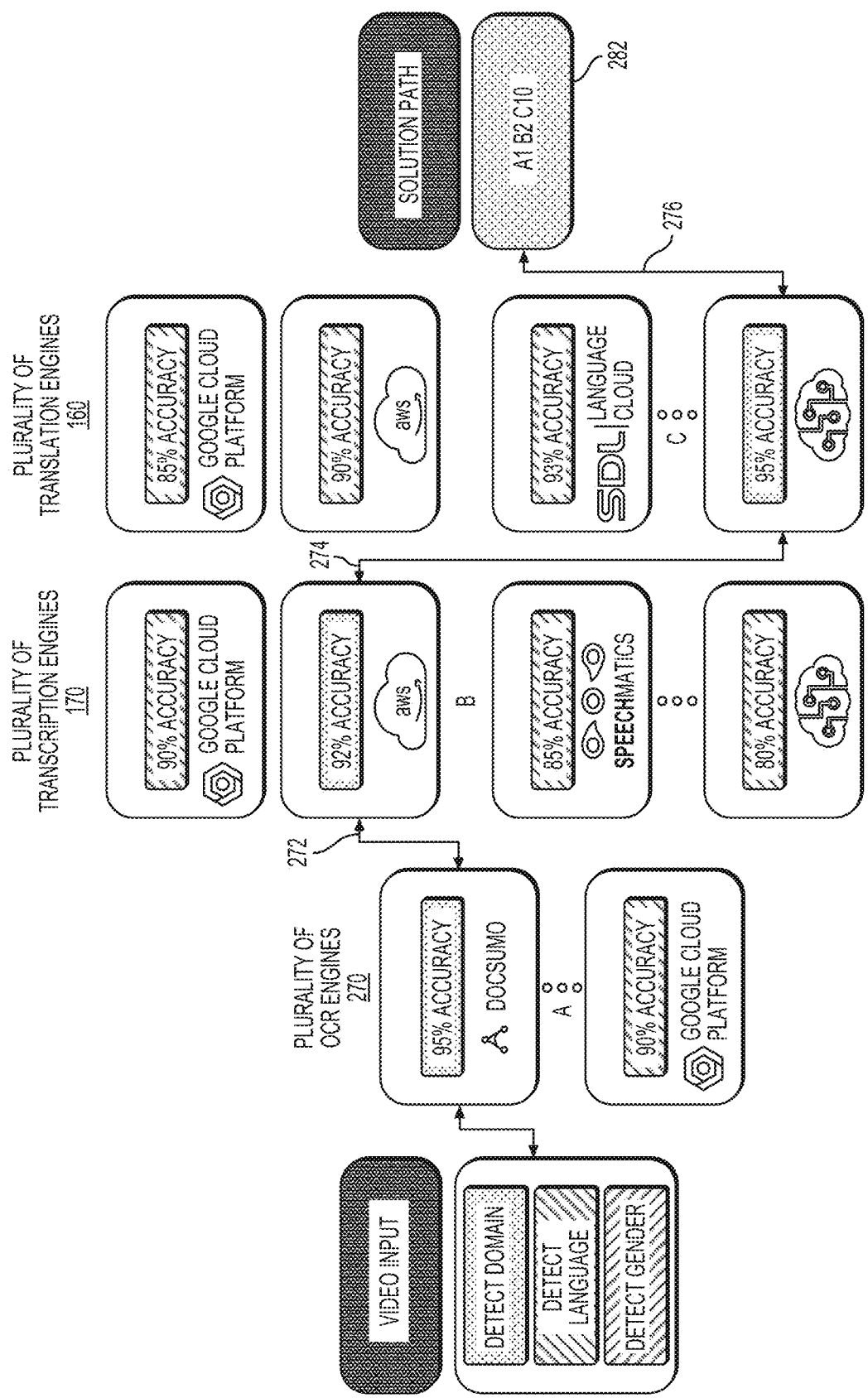
FIG. 2C shows a block diagram of the generation of a solution path by the NextGen AI engine in accordance with the examples disclosed herein.

FIG. 2C shows a block diagram of the generation of the solution path by the NextGen AI engine 102 in accordance with the examples disclosed herein. The engine selector 202 of the NextGen engine 102 runs various solutions paths with different combinations of a plurality of OCR engines 270, the plurality of translation engines 160, and the plurality of transcription engines 170. A step-wise score is generated for each step of a given solution path. For example, each of the steps 272, 274, and 276 of the solution path A1B2C10 is scored and an aggregate score can be generated from individual step-wise scores. Similarly, other combinations may also be generated and scored. The solution path with the highest score e.g., A1B2C10 is recommended as the final path 282. At every step, the solution with the highest accuracy is picked and a solution path is recommended which ensures the highest accuracy among the available solution paths.

Figure 3A:
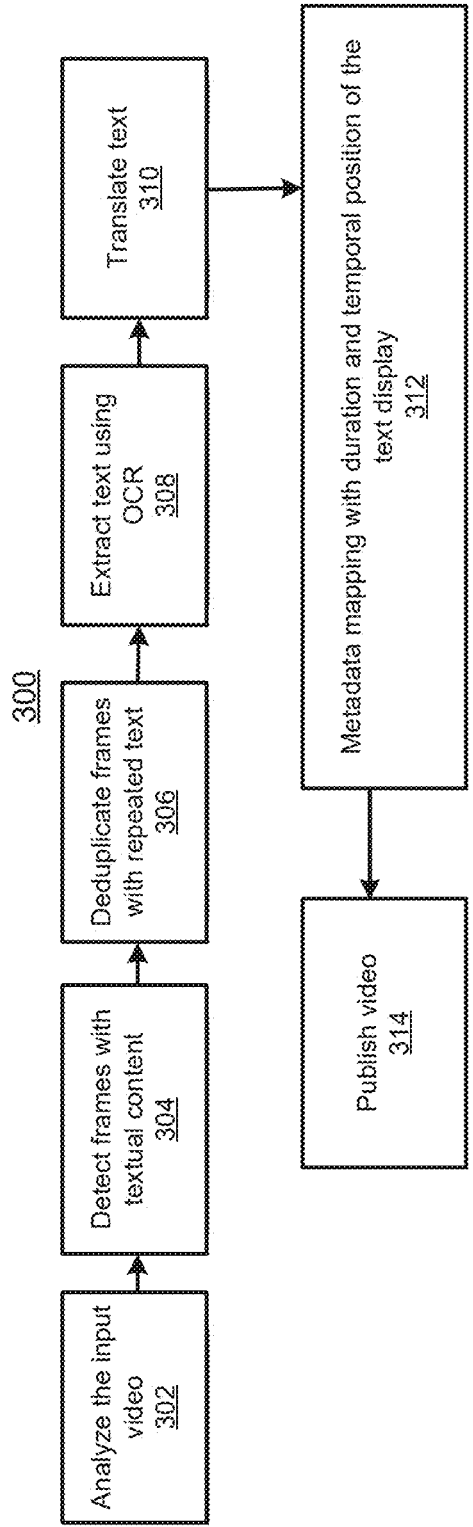
FIG. 3A shows a block diagram of the various steps involved in extracting text from an input video in accordance with the examples disclosed herein.

FIG. 3A shows a block diagram 300 of the various steps involved in extracting the text from frames of the input video 110 by the text extractor 106 in accordance with some examples. The input video 110 is initially analyzed 302 in terms of frames e.g., 70 frames per second (fps), or 120 fps, etc. Detection of frames within the video with text is based on deep neural networks (DNNs) and bidirectional Long Short Term Memory (LSTM). Each frame may be considered as an image and AI-based image analysis models can be applied to detect frames with textual content 304 as further detailed herein.

Meaningful text is generally spread over multiple frames, and the text may be displayed for a significant amount of time. In an example, textual content displayed for a predetermined threshold time defined as a percentage of the entire run time of the input video 110 can be identified as a meaningful text that is to be extracted. Accordingly, multiple frames with the same textual content are deduplicated 306 so that one frame forming an image containing a dear rendering of the textual content may be selected during the deduplication 306. The text is extracted 308 from the frame/image using OCR by employing one of the plurality of OCR engines 270 that was automatically selected in the final path 282. The extracted text is translated 310 and metadata such as the duration of display of the text and the temporal position of the textual display in the input video 110 may be mapped 312. After the extraction and de-duplication of the video frames, the input video 110 may be published 3•14 for the next step in the translation processing.

Figure 3B:
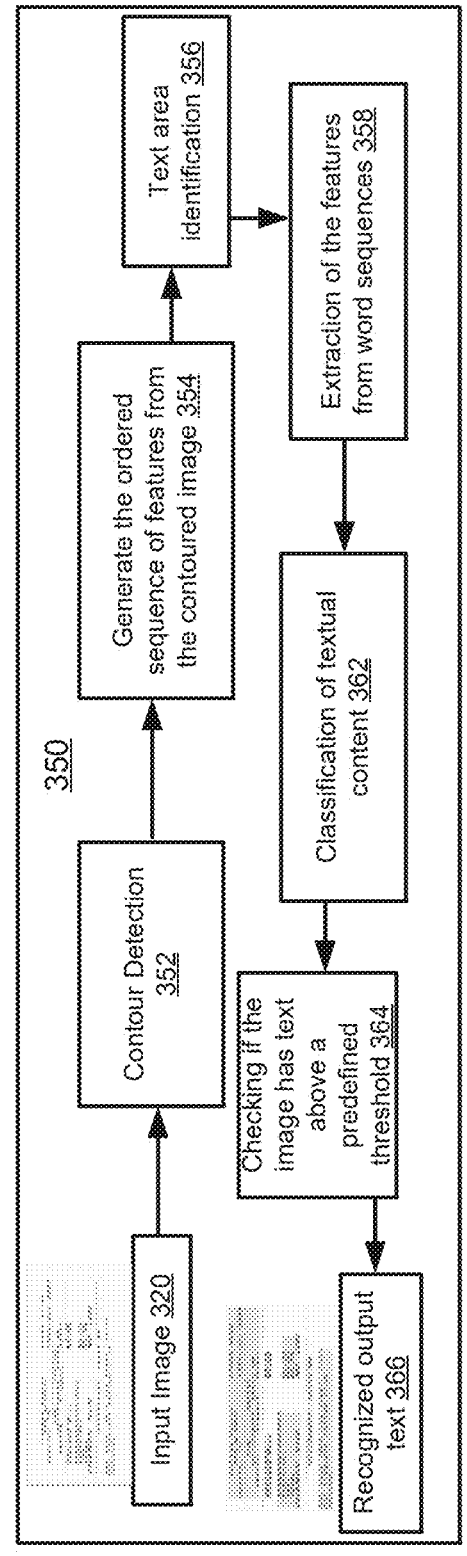
FIG. 3B shows a block diagram of the steps of identifying text from a given frame in accordance with the examples disclosed herein.

FIG. 3B shows a block diagram 350 shows further details of the steps of identifying text from a given frame implemented by the text extractor in accordance with the examples disclosed herein. The video frames may be initially analyzed via contour detection 352 for the identification of features indicating a likelihood of the presence of textual content in the frames. Then, a source language-based CNN trained in identifying the textual content of the source language can be used to generate an ordered sequence of features 354 indicative of textual content in the contoured image. The source language-based CNN can be trained for predicting letters of the source language and compensates for the errors that may be produced by the process of contour detection, which may misidentify other content, such as geometric figures as textual content. The text area identification 356 is executed for finding the relevant portion or identifying an area of the frame including the textual content. To locate the text region within the frame and to create a bounding box on each letter, a CNN-based architecture can be used which helps to predict the characters. Detecting the textual area within the frame can simplify and improve the speed of the textual identification process. The output from the text area identification 356 is passed through a bidirectional-LSTM to extract word features 358. Recognition or classification of the textual content 362 can be executed by a recurrent neural network (RNN) trained to classify text based on context. Finally, the extent of the area including the textual content may be used as an attribute in selecting those frames with meaningful textual content. In an example, a percentage of textual features to non-textual features can be calculated. Accordingly, it is determined 364 if the input image 320 has text above a predefined threshold percentage. The video translation system 100 may be configured to identify frames with textual content occupying an area greater than a predefined threshold for a frame to be classified as a textual content bearing video frame. OCR can then be run on the frames having text above the predefined threshold for recognizing the textual content 366.

A mechanism that detects the change in frames of the input video 110 may be implemented by the video translation system 100 for identifying changes in the textual content of the video frames. It is based on a full convolution network on top of Siamese networks. Rather than implementing a simple classification, the idea of comparing the images by customizing a discriminative implicit metric is proposed. It can be divided into two parts: Firstly, a Siamese Network which is fully convolutional is implemented and the already defined distance metric can be used for discriminating between textual content between frames. This process can be treated as learning a dissimilar function directly on raw images. To summarize, two images can be provided as input with different timestamps to the Siamese neural network. The feature vectors for both images are extracted. It may be noted that the images have to be treated by the same network for feature extraction. The extracted feature vectors are passed through the convolutional layers and finally the Euclidean distance to measure the changes for two feature vectors can be calculated. If there are no substantial changes in the images, the images would have nearly similar feature vectors and if the changes are relevant then the images would have different feature vectors.

It may be appreciated that the video translation system 100 can be configured for the translation and transcription of any given language pair. By way of illustration and not limitation, the video translation system 100 can be configured to translate/transcribe various combinations of languages, such as Japanese to English, vice versa, etc. Accordingly, the video translation system 100 can include many neural networks trained to identify the textual content of the specific languages. Therefore, a neural network trained to identify Japanese scripts may be used in the Japanese to English transcription/translation. Similarly, another neural network trained to identify Arabic or Spanish scripts may be used for any combinations of Spanish, English, or Arabic translations. Any number of neural networks thus trained for different languages can be employed by the video translation system 100 for translating/transcribing between different language combinations.

Traditional techniques like OCR used for recognizing the text from the documents may maintain good accuracy for scanned documents. However, the same techniques cannot be applied for text detection from images such as video frames, due to lower accuracy. The recognition of text from a video scene needs special features because the characters present in the scene may differ in size, shape, color, writing style, orientation, aspect ratio, and quality of the image due to different lighting conditions, blurred and complex backgrounds. Accordingly, the relevant changes for text identification need to be detected while other changes need to be ignored. The methodology implemented for deduplicating the video frames is to be robust enough to account for slightly different orientation/lighting conditions such as those that may occur in images captured using satellites which may be prone to variable cloud covers, sunlight reflection, and changes in the azimuthal and elevational angles of the satellite itself.

FIGS. 4A and 4B illustrate a de-duplication of video frames implemented by the text extractor 106 in accordance with some examples disclosed herein. In FIG. 4A, two images, image 1 and image 2 corresponding to two video frames can be received by a fully convolutional neural network 402 for feature extraction. Feature maps 1 can include features extracted from image 1 and feature maps 2 can include features extracted from image 2. The pixel-wise Euclidean distance 404 is estimated for the feature maps 1 and the feature maps 2. A sigmoid function 406 is applied to the result to obtain 408 the similarity. In an example, the similarity is determined to be 0.15. Based on a comparison of the similarity with a predetermined similarity threshold (e.g., 0.5), it can be concluded that image 1 and image 2 are dissimilar.

Similarly, in FIG. 48, image 1 can also be compared with image 3 corresponding to another video frame. The fully convolutional neural network 402 extracts features to generate feature maps 1 and feature maps 3. The pixel-wise Euclidean distance 414 between the feature maps is obtained, and the sigmoid function 416 is applied to determine the similarity. Based on a comparison of the similarity value of 0.9 with the predetermined similarity threshold (e.g., 0.5), it can be determined that the video frames corresponding to image •1 and image 3 are similar and one of the images can be further analyzed while the other image can be disregarded.

Figure 5:
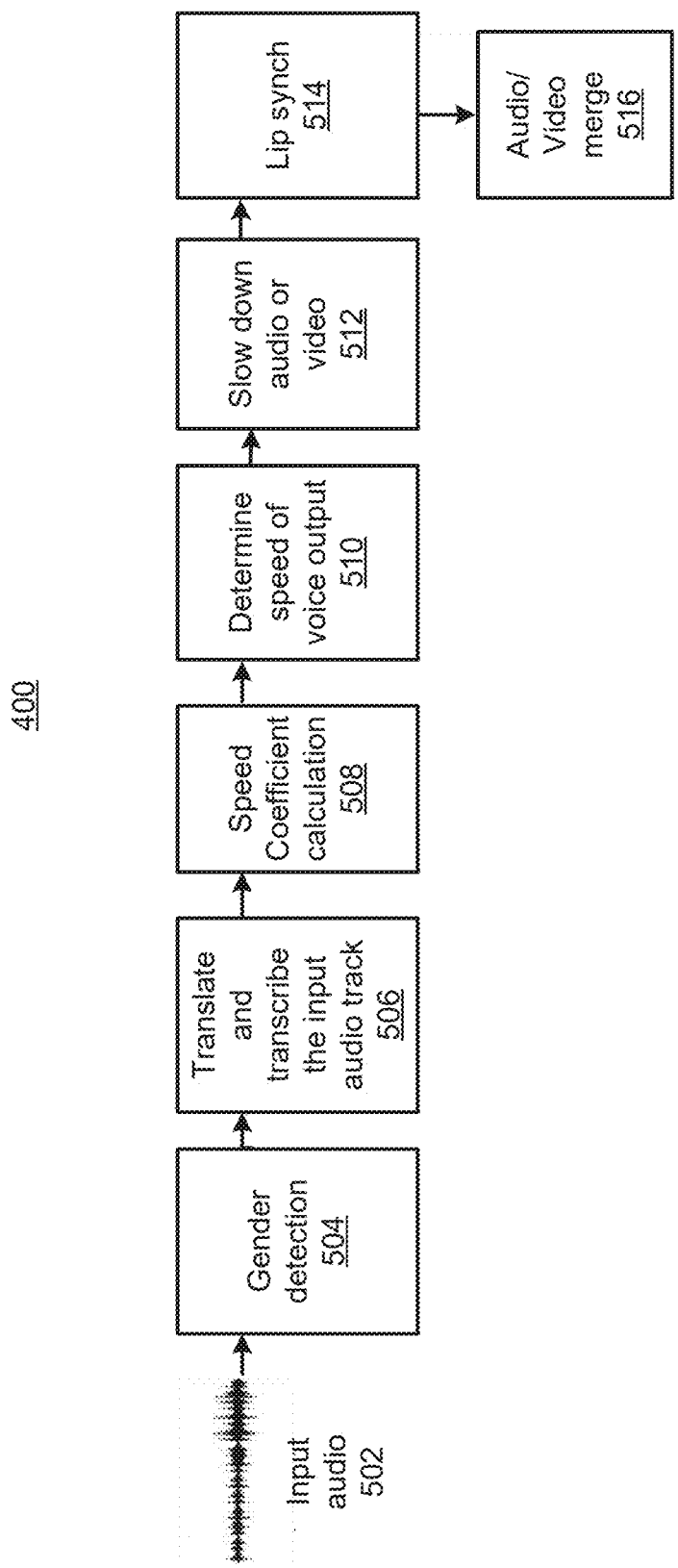
FIG. 5 shows a block diagram of the steps involved in an audio dubbing process in accordance with the examples disclosed herein.

FIG. 5 shows a block diagram 500 of the steps involved in generating the output video 190 implemented by the output file processor 136 in accordance with the examples disclosed herein. Initially, the input audio track is extracted 502 by the audio extractor 104 from the input video 110 and the gender of the speaker(s) in the input audio track is detected 504. The input audio track is transcribed and translated 506 to generate translated text in the target language corresponding to the input audio track. In an example, the text generated at 506 can also include the translation of the input audio track and the text extracted from the video frames of the input video 110. A speed coefficient is calculated 508 to determine the speed of the translated speech or voice output relative to the video content of the input video 110. Based on the relative speed of the voice output versus the video content, it is determined 510 if the voice output or the video has to be speeded up or slowed down 512 to be synced with the video. In case the audio or the voice output is too fast, while the video is slower, one or more pauses may be inserted 512 into the voice output to generate an output audio track as detailed further infra. On the other hand, if the video is faster than the audio, additional video frames automatically generated using the Generative Adversarial Network (GAN) can be added to slow down the video content of the input video 110. The lips of the person speaking in the video are manipulated 514 to sync with the translated audio. The output audio track is merged 516 with the video content (which may be altered with additional, automatically-generated video frames) to generate the output video 190 in the target language.

Figure 6:
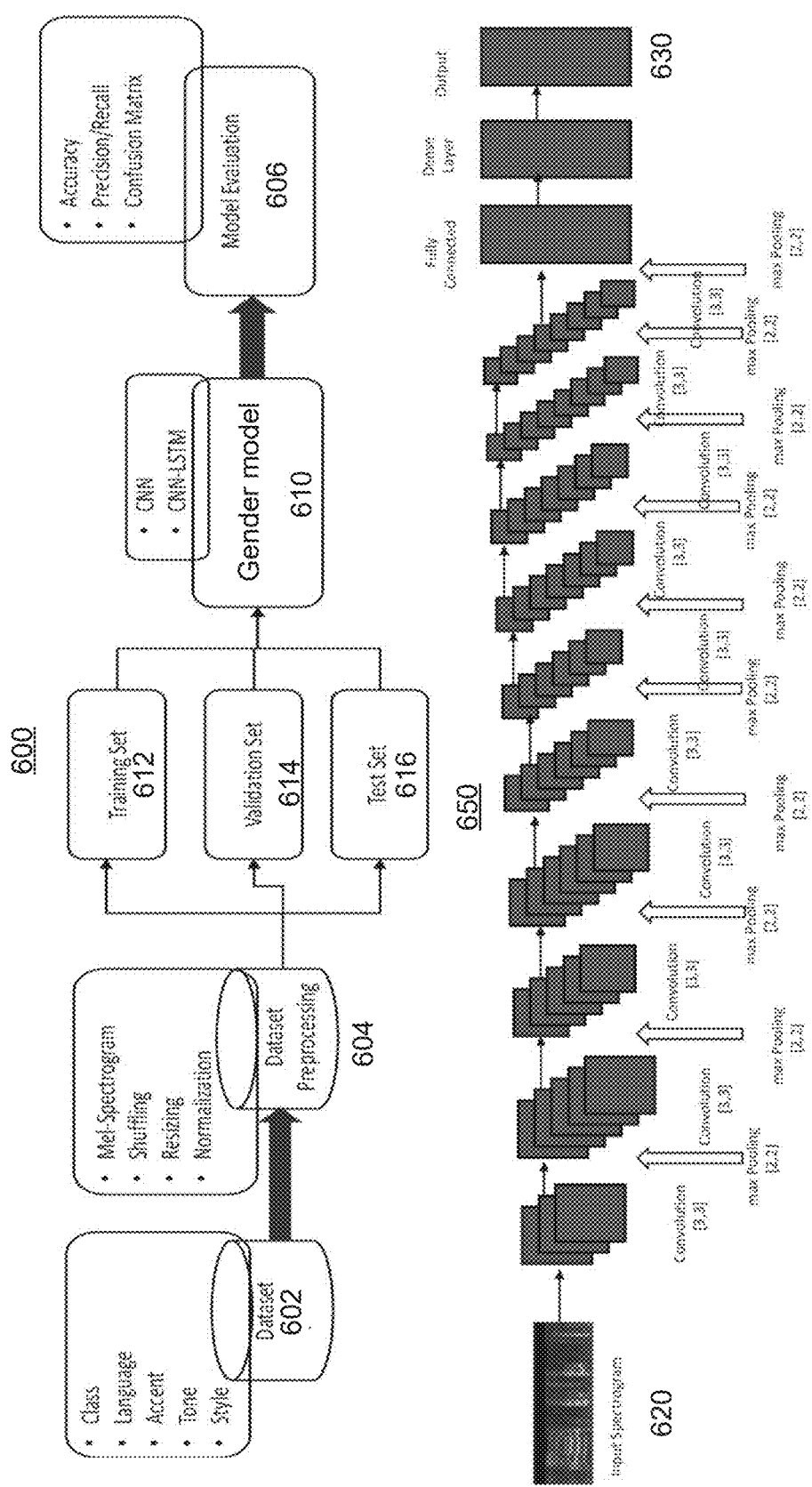
FIG. 6 shows an architecture for gender detection for audio dubbing in accordance with the examples disclosed herein.

FIG. 6 shows the architecture 600 for gender detection implemented by the gender detector 142 in accordance with the examples disclosed herein. The gender detector 142 can include a gender model 610, based on CNN/CNN-LSTM methodologies for gender detection in the input audio track extracted from the input video 110. The gender can be detected, not only from voice quality comparison e.g., tone but also based on language, accent, style, etc. A data set 602 can be prepared with audio samples of different voices with different tones, accents, and styles speaking a particular language for training the gender model 610 for gender detection in one language. For example, in addition to the tone specific words such as 'he', and 'she' are indicative of gender. Some languages include gender-specific verb forms. The gender model 610 may thus be trained to use such semantic information in addition to the tone for gender detection. The audio samples in the data set 602 are initially converted into Mel-spectrograms. The Mel-spectrograms are preprocessed by shuffling, resizing, and normalizing for a preprocessed dataset 604. The preprocessed dataset 604 is further divided to form a training set 612, a validation set 614, and a test set 616 which are used to generate the gender model 610. Similarly, different gender models implementing the CNN/CNN-LSTM methodologies can be trained for gender detection in different languages. As mentioned above, a gender model specific to one language may employ a particular type of language data (e.g., particular words e.g., 'he', 'she', etc.) in addition to voice quality for gender detection while another gender model used for another language may use another type of semantic information (e.g., gender-specific verb forms). Once trained for a particular language, the gender model 610 can be evaluated 606 for accuracy, precision/recall using a confusion matrix. The convolution network layers 650 process the audio received as an input spectrogram 620 and identify gender at output layer 630.

The speed at which the video frames are moved in the input video 110 may not always match the speed at which the target language is spoken which can result in a mismatch of the time durations between audio generated from the translations and the original video. This is because the input video 110 is initially made for the source language and its conversion to the target language can change the speed of the speech, the pauses, and styles. These differences that occur during audio dubbing can be minimized by using a speed coefficient. The formula for deriving the speed coefficient (SC) is shown below:

$$\text{Speed Coefficient } (SC) = \frac{\text{duration of audio segment}}{\text{duration of audio segment from subtitle file}} \quad \text{Eq. (1)}$$

The value of SC determines the speed of the audio. A higher value of SC increases the duration (and decreases the speed) of the translated audio/voice output while a lower value of speed coefficient would decrease the duration (and increase the speed) of the translated audio. A few possible scenarios are discussed below:

a) The translated audio is longer than the original audio: In this case, the SC of the translated audio is decreased by a small value and the video frames of the original video may be extended so that a balanced output is obtained in terms of speed with very few observable changes.

b) The translated audio is shorter than the original audio: In this case, the speed coefficient of the translated audio is increased by a small value and then the pauses are intelligently inserted into the translated audio so that a balanced output is obtained in terms of speed with very few observable changes. Accordingly, a pause file can be generated, and divided into two equal segments. Based upon the duration and the segments, the pauses can be added before and after the generated/translated audio file. Experiments were performed and it was determined that the typical value of speed coefficient can lie between 0.8 to 1.3 for good synchrony between the audio file and the video frames. A bi-lingual text aligner can be used to align the text in the source language with that of the target language. It is used to create parallel corpora for the video translation system 100. The two languages can also be mapped in different vector spaces. The sentence embeddings may be needed to perform bilingual text alignment. Forced alignment techniques of automatic speech recognition can be used to align the audio with text.

Figure 7:
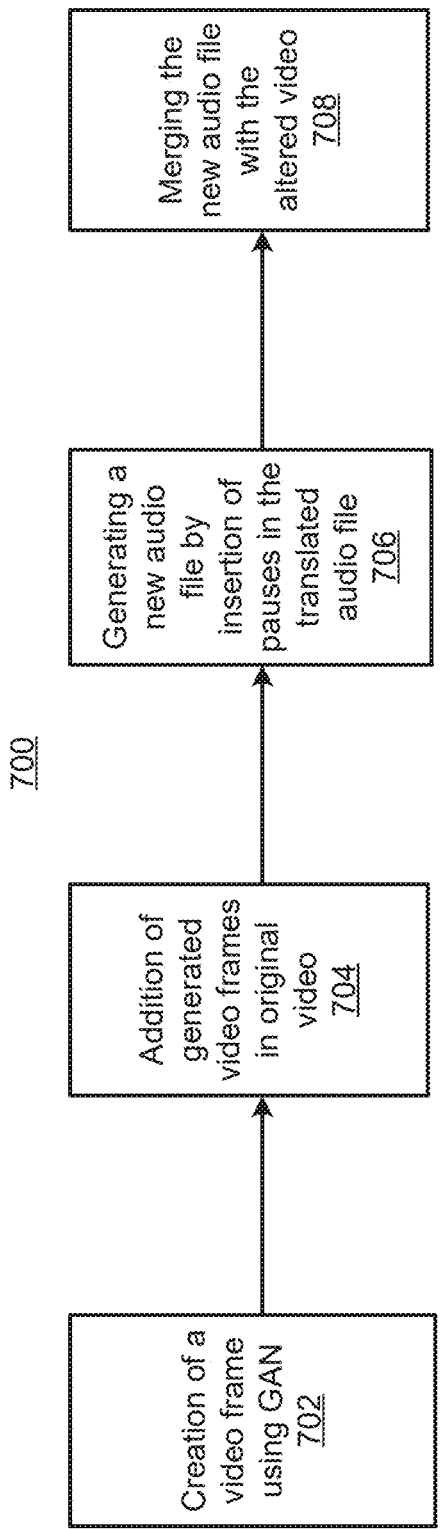
FIG. 7 shows a block diagram of the various steps involved in automatic video frame generation in accordance with the examples disclosed herein.

FIG. 7 shows a block diagram 700 including the various steps involved in automatic video frame generation in accordance with the examples disclosed herein. For specific cases, where the audio segment is too fast, the speed can be reduced until the speed coefficient reaches a value of 1.3. As a result of this transformation, the duration of audio may be increased. However, if the duration of the audio is increased sub-optimally, portions of the audio may still be asynchronous with corresponding portions of the video, wherein the video duration becomes less than the audio duration. To overcome this asynchrony, duplicate video frames can be generated 702. In an example, high-resolution images can be generated by employing Generative Adversarial Networks (GANs). This increases the complexity of the video translation system 100 as the video frame generated using GANs may need to maintain spatial and temporal coherency with the existing frames of the original video i.e., the input video 110. A video can be considered as an even sequence of points in a latent space where each point corresponds to an individual video frame. Therefore, a video generator can be designed to generate a sequence of points in the latent space and an image generator can be designed that maps the generated points into image space. For the image generator, a temporal shift generator can be designed, which introduces the temporal shifting in the distinct frames of the generator. This shifting mechanism ensures the exchange of information between neighboring distinct frames of the video.

The GAN-generated frames can be added 704 to the input video 110 based upon the extended audio duration. A new audio file i.e, the output audio track can be generated by inserting 706 pauses with the translated audio input i.e., the voice output. The output video 190 can be generated by merging 708 of the generated audio file with the altered video including the GAN-generated frames.

Figure 8:
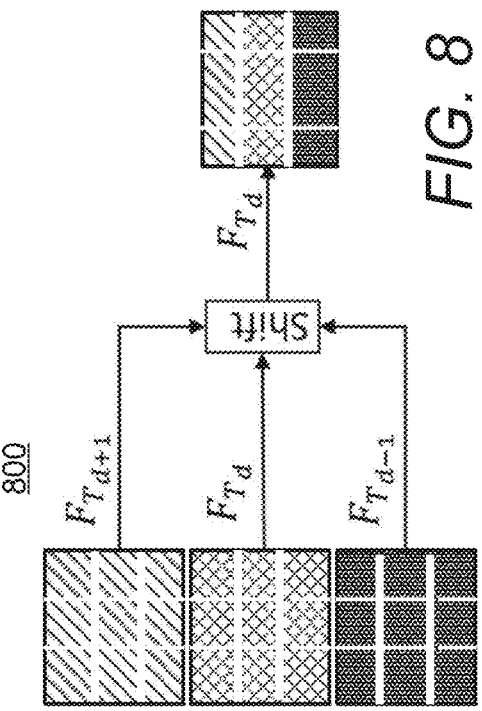
FIG. 8 shows a diagram of a temporal shift in accordance with the examples disclosed herein.

FIG. 8 shows a diagram of a temporal shift 800 inserted into the input video 110 in accordance with the examples disclosed herein. A temporal shift generator enables the addition of video frames to the input video 110 for long voice segments i.e., when at least a portion of the translated audio file has a greater temporal length than the corresponding portion of the input video 110. The shifting operation can be performed by a temporal shift generator to replace the features of a frame corresponding to the current timestamp ($T_0$) with features from a distinct frame before $T_0$ and a distinct frame after $T_0$. i.e., features from distinct frames that immediately precede and immediately succeed $T_0$ replace features of the frame corresponding to $T_0$. To determine the distinct frames, the edge descriptors of the frames are calculated. Then the Euclidean distances of the neighboring frames from the current frame are calculated. Generally, the threshold value of the Euclidian distance for identifying distinct video frames in any given video was determined as 0.3 from different experiments. Assuming that the distinct frames identified are represented as $T_{d-1}$ and $T_{d+1}$, a temporal shift 800 can be implemented to enable the generation of video frames that fit between the distinct frames.

Figure 9:
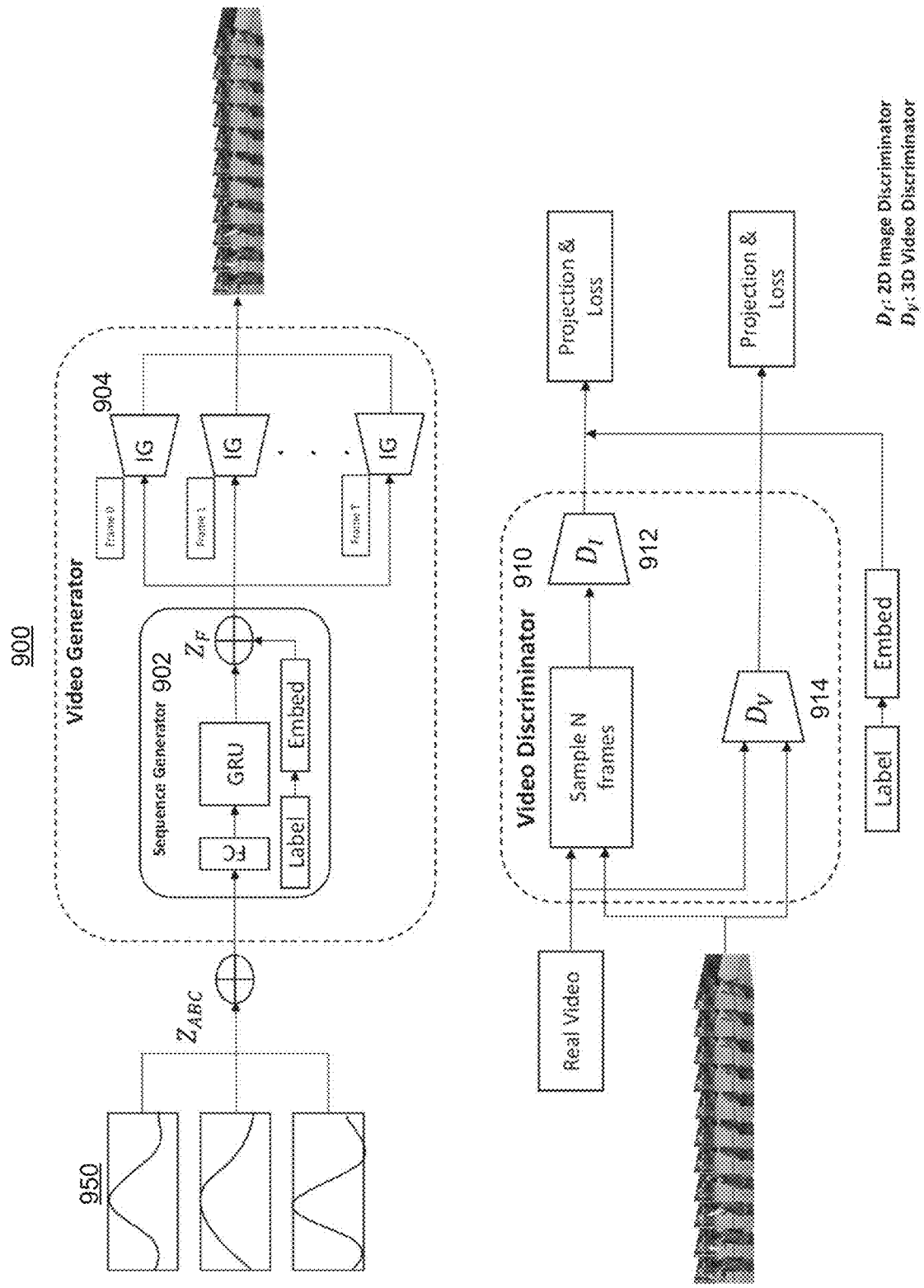
FIG. 9 shows the architecture of a video generator in accordance with the examples disclosed herein.

FIG. 9 shows the architecture of a video generator 900 in accordance with the examples disclosed herein. The video generation architecture of the GAN includes a sequence generator 902, an image generator 904, and a video discriminator 910. After the temporal shift generator 950, an image generator (IG) 904 comprising 2D convolutions can be added. The image generator 904 receives the information of distinct neighboring frames e.g., frame 0, frame 1, etc. The video discriminator 910 may determine if the frames generated by the image generator 904 are usable for the creation of the output video 190. The video discriminator 910 is designed to include a 2D image discriminator 912 that evaluates the subset of video frames and a 3D discriminator 914 for evaluating all the frames for motion consistency of the video. The video discriminator 910 can therefore provide real-time feedback to the image generator 904 in an iterative process. The video generator 900 including the image generator 904 and the video discriminator 910 may be explicitly trained using training images for the image generation and for determining the quality of images.

Figure 10:
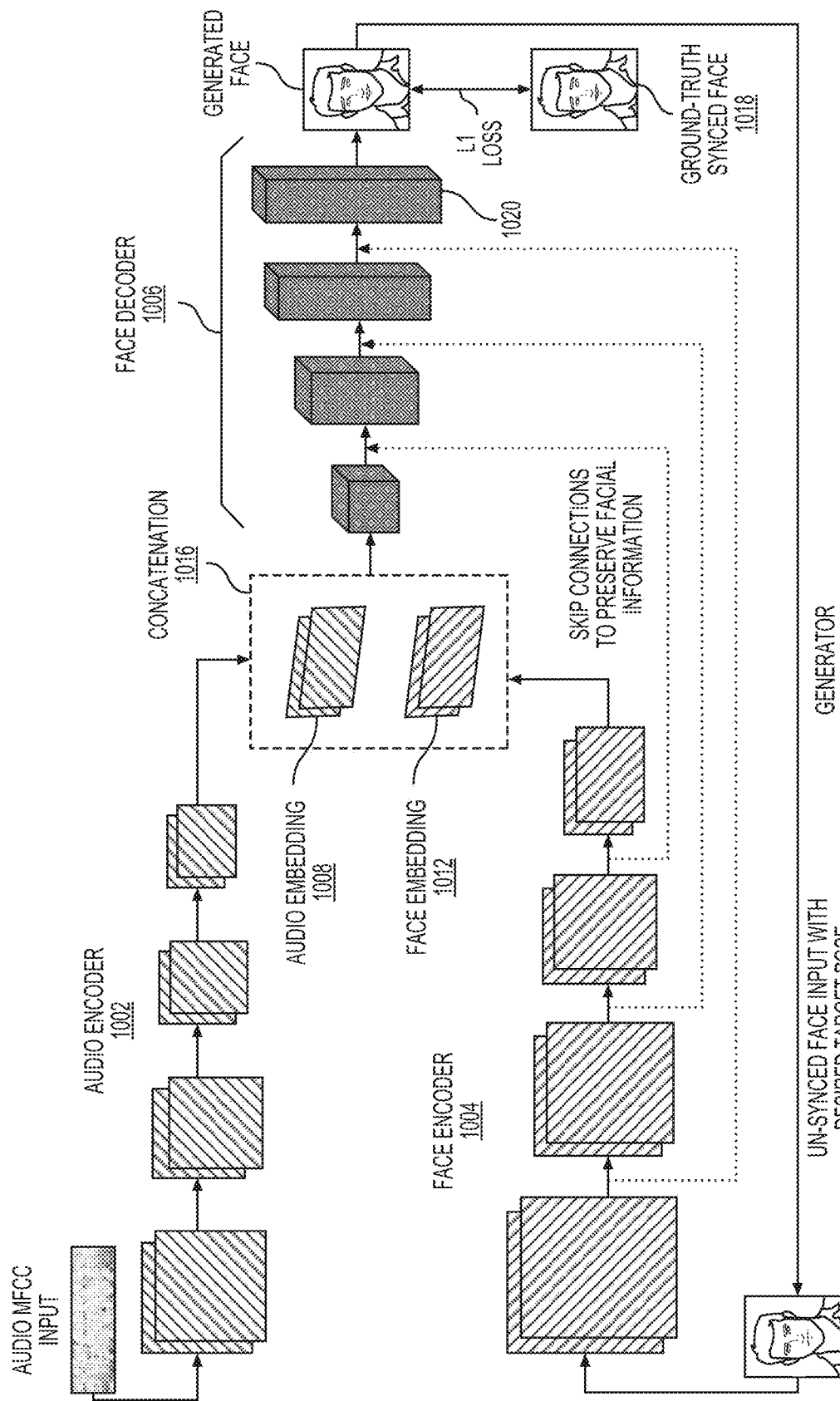
FIG. 10 shows a generator architecture for lip-synching using a Generative Adversarial Network (GAN) in accordance with the examples disclosed herein.

FIG. 10 shows a generator 1000 based on GAN in accordance with the examples disclosed herein. The generator architecture for lip-synching using GAN contains two networks, the generator 1000 that generates faces in sync with the audio provided and a discriminator (as described infra) that validates the generated face so that the generated face is in synchrony with the output audio track. The generator 1000 can be trained in an adversarial manner such that the generator 1000 learns to create realistic images that are in sync with the output audio track. The generator network includes an audio encoder 1002, a face encoder 1004, and a face decoder 1006. In addition, posture detection of the face can also be implemented so that the posture can be provided as an input to the face encoder 1004. It may be appreciated that the details regarding the number of blocks in different networks are e.g., the audio encoder 1002, the face encoder 1004, and the face decoder 1006 are shown for illustration purposes only and that more or less number of blocks may be used in the generator 1000 according to the examples disclosed herein.

Referring to the face encoder 1004, an input ground truth face image 1014 can be provided with a target pose. The lower half of the input ground truth face image 1014 may be masked so that it provides only the information about the pose of the face but not about the shape of the lips. The face encoder 1004 comprises a series of residual blocks with intermediate down-sampling layers and embeds the input ground truth face image 1014 into a face embedding, A CNN network can be used as an audio encoder 1002 that takes Mel-frequency cepstral coefficient (MFCC) heatmap as an input and creates an audio embedding 1008 which can be further concatenated 1016 with the face embedding•1012 to create a joint audio-visual embedding. The face decoder 1006 produces a lip-synchronized face 1018 from the joint audio-visual embedding by superimposing the masked region of the input ground truth face image 1014 with an appropriate mouth shape. The face decoder 1006 comprises a series of residual blocks with deconvolutional layers for up sampling the feature maps. The output layer 1020 of the face decoder 1006 contains a sigmoid function activated 1×1 convolutional layer with 3 filters. After every up sampling operation at face encoder 1004, skip connections can be provided between the face encoder 1004 and the face decoder 1006 which ensures that the fine grained facial features are retained by the face decoder 1006 while generating the faces. The face decoder 1006 generates a fake mouth shape matching the given pose that has been fed back to the face encoder 1004 as an input.

Figure 11:
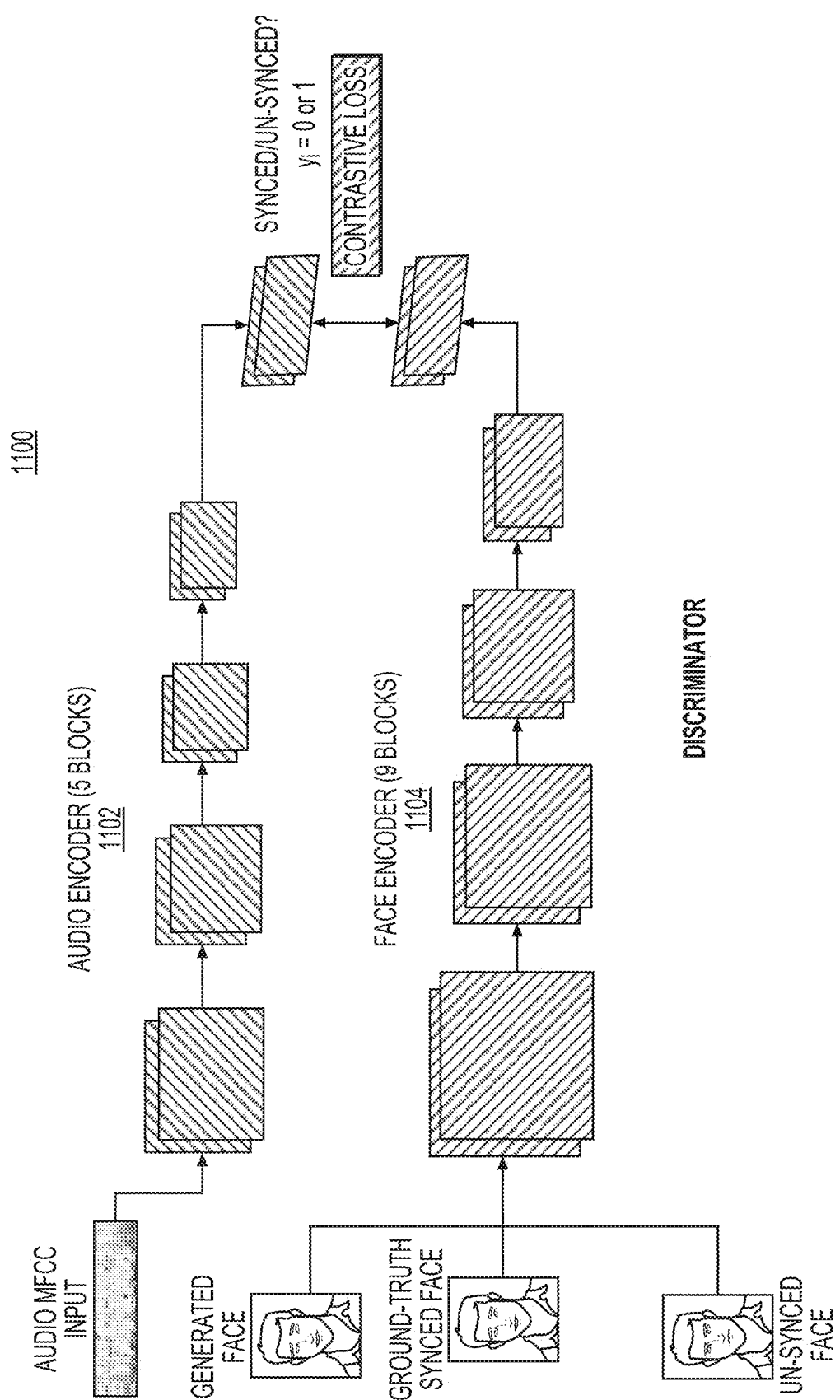
FIG. 11 shows a discriminator architecture for lip-synching using GAN in accordance with the examples disclosed herein.

FIG. 11 shows the discriminator 1100 for lip-synching using GAN in accordance with the examples disclosed herein. In an example, the discriminator 1100 may be used to encode an input face and audio into fixed representations and computes the L2 distance d between them. The face encoder 1104 and audio encoder 1102 used in the discriminator network 1100 can be the same as those used in the generator 1000.

Figure 12:
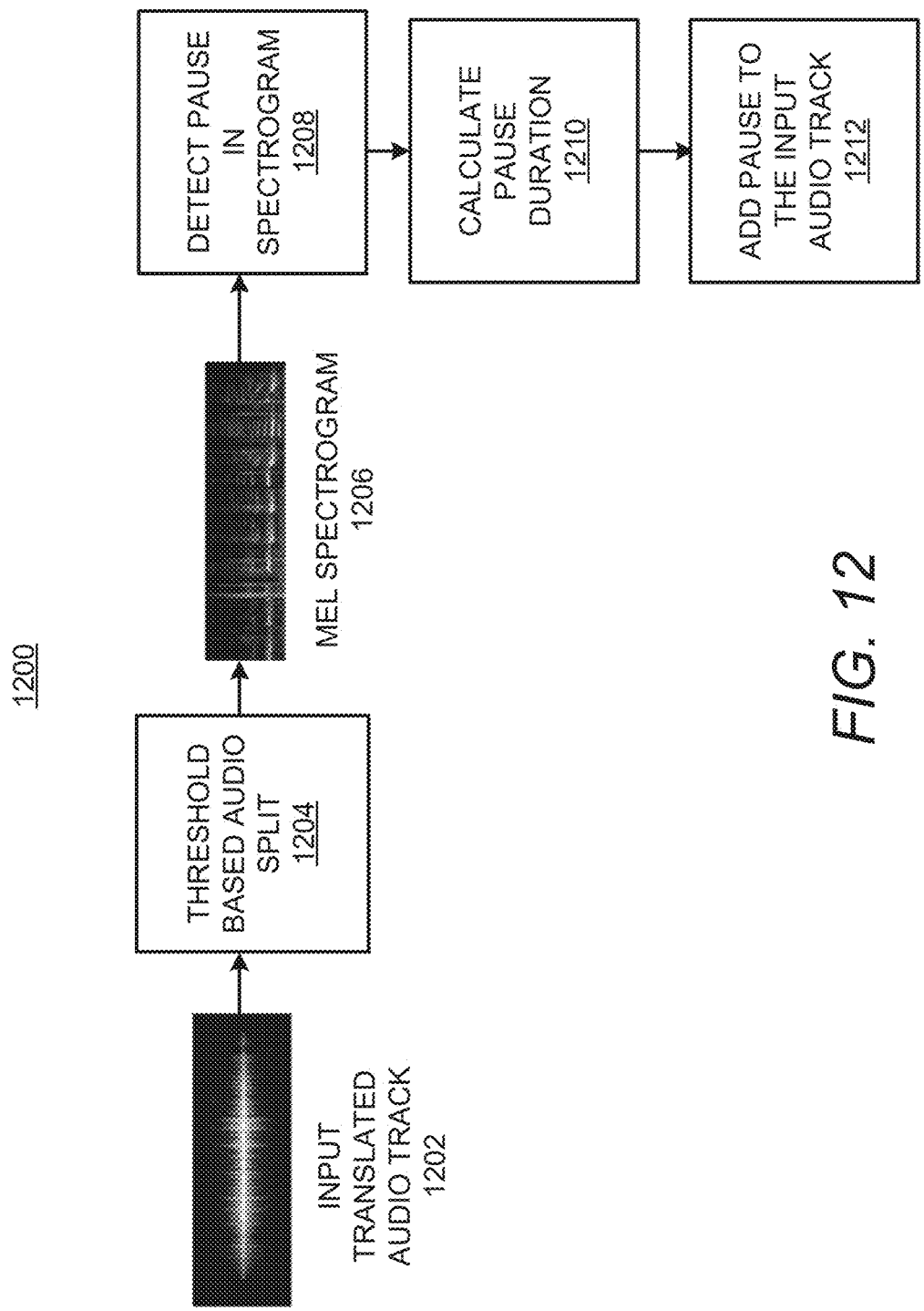
FIG. 12 shows the steps involved in generating the translated subtitles in accordance with the examples disclosed herein.

FIG. 12 shows the steps involved in generating the translated subtitles in the target language 1200 in synchrony with the input video 110 in accordance with the examples disclosed herein. The voice output is generated from the translated transcription of the input audio track and converted to a Mel-spectrogram 1206. The steps to automatically generate subtitles in various languages to be displayed synchronously with a given video can be implemented without human intervention. The generation of subtitles is based on language-specific stop words, pause word detection, and gender change. The pauses are detected 1208 within a sentence using a customized CNN, The pause duration is calculated 1210 based on the start and end times given in the subtitles for the input video 110. The pauses can be added 1212 at appropriate time points in the translated audio track or the voice output. In an example, pauses can be added to the beginning and end of sentences based on the stop words.

In an example, the stop words can be used to determine whether the subtitles need to be divided or broken into separate sentences. Each language may include its own set of stop words which can be different in terms of how the language is spoken versus how the language is written. For example, in English, the stop words or stop characters can include ".", "!". "?" while in Japanese the stop words or stop characters can include "o", ",". The stop words can also be used for identifying the end of a sentence. CNN-based audio segmentation can be implemented to detect gender in videos. It splits 1204 audio signals or the voice output into homogeneous zones of speech and helps in gender classification.

Figure 13:
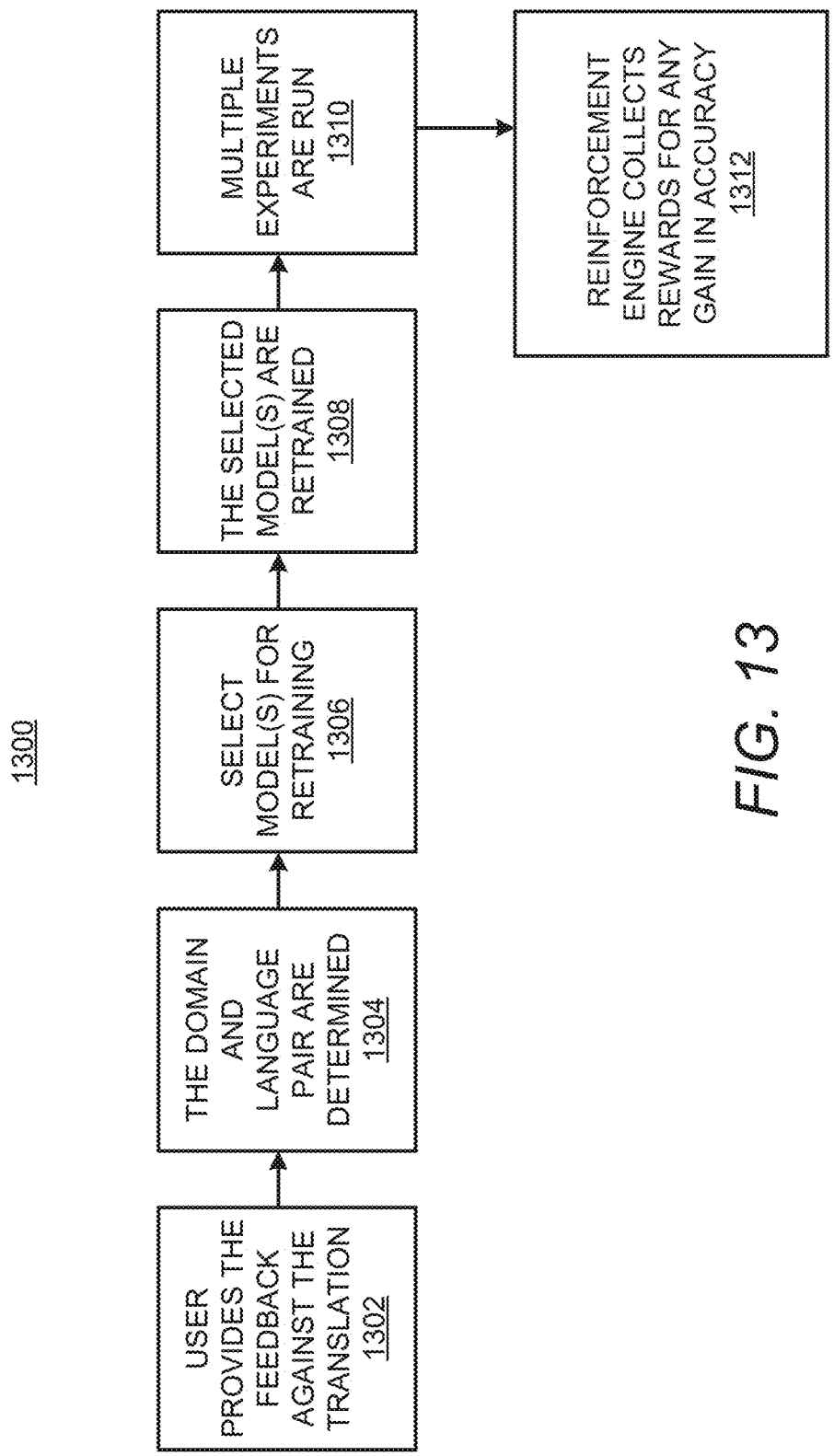
FIG. 13 shows the steps for automatic feedback incorporation using reinforcement learning in accordance with the examples disclosed herein.

FIG. 13 shows the steps for automatic feedback incorporation using reinforcement learning 1300 in accordance with the examples disclosed herein. This helps in regularly updating the models based on the feedback without any human intervention. Upon providing the output video 190 to the user, explicit or implicit feedback 1302 may be received from the user on the translation and transcription outputs of the video translation system 100. In an example, such user feedback can be provided to the NextGen AI engine 102 which provided the initial selection 1306 of the transcription and translation engines. When the number of user comments providing feedback reaches a certain threshold e.g., 1000 user comments, the model retraining 1308 for that language pair and domain is automatically triggered 1304. In an example, reinforcement learning can output positive or negative rewards based on desirable or undesirable behavior of the machine learning (ML) components. The reinforcement agent starts various experiments 1310 to check the accuracy gain using a newer model (Le., for the NextGen AI engine 102). The agent collects 1312 a positive reward wherever there is a gain in accuracy and a negative award whenever there is a drop in accuracy. The agent keeps collecting the rewards based on the long-term policy and takes steps so that there is an overall gain in the outcome. When a predefined threshold of positive rewards is achieved by the agent, the models in the NextGen AI engine 102 may be updated.

Figure 14:
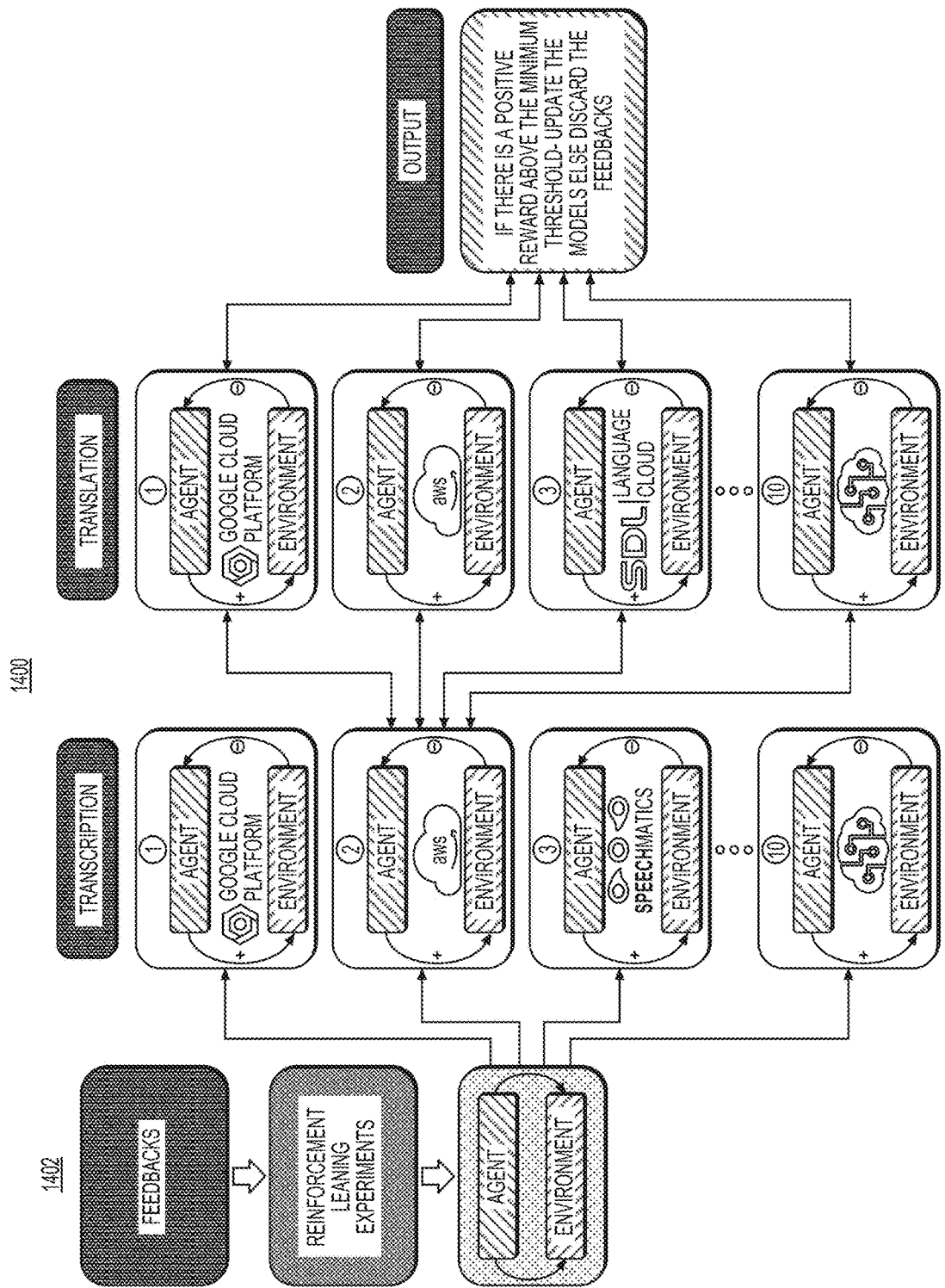
FIG. 14 shows the incorporation of reinforcement learning for retraining the NextGen Ai engine in accordance with the examples disclosed herein.

FIG. 14 shows the incorporation of reinforcement learning 1400 for retraining the NextGen AI engine 102 and the selection of the transcription and translation services. A reinforcement agent can interact with the various environments (or models) associated with different transcription and translation services. Based on the desirable or undesirable behavior of the environment, the agent may collect positive or negative rewards so that if the positive reward is above a minimum threshold, the models are updated and the feedback 1402 is discarded.

Figure 15:
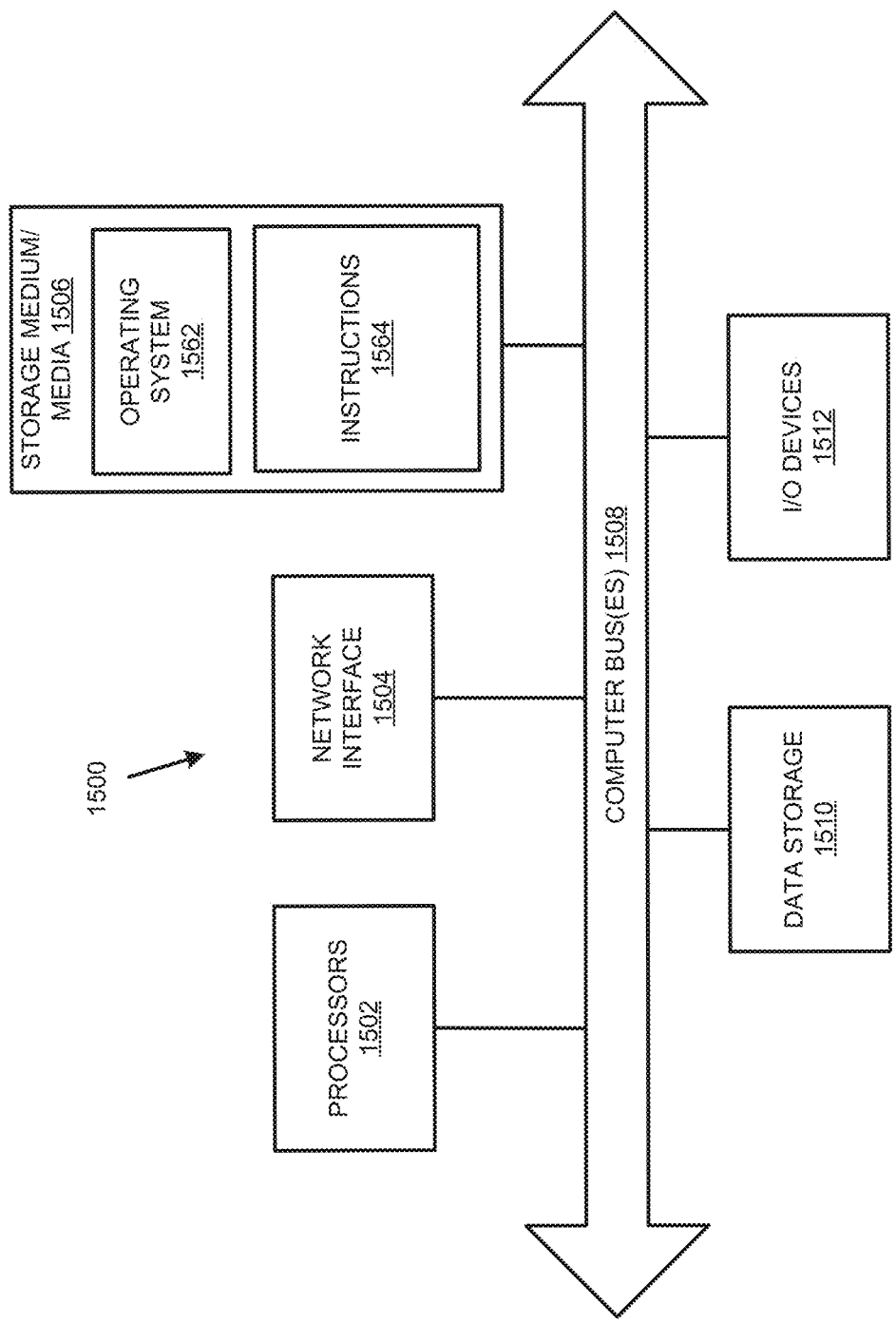
FIG. 15 illustrates a computer system that may be used to implement the video translation system in accordance with the examples disclosed herein.

FIG. 15 illustrates a computer system 1500 that may be used to implement the video translation system 100. More particularly, computing machines such as desktops, laptops, smartphones, tablets, and wearables which may be used to generate or access the data from the video translation system 100 may have the structure of the computer system 1500. The computer system 1500 may include additional components not shown and that some of the process components described may be removed and/or modified. In another example, a computer system 1500 can sit on external-cloud platforms such as Amazon Web Services, AZURE® cloud or internal corporate cloud computing clusters, or organizational computing resources, etc.

The computer system 1500 includes processor(s) 1502, such as a central processing unit, ASIC or another type of processing circuit, input/output devices 1512, such as a display, mouse keyboard, etc., and a network interface 1504, such as a Local Area Network (LAN), a wireless 802.11x LAN, a 3G, 4G or 5G mobile WAN or a WiMax WAN, and a processor-readable medium 1506. Each of these components may be operatively coupled to a bus 1508. The computer-readable medium 1506 may be any suitable medium that participates in providing instructions to the processor(s) 1502 for execution. For example, the processor-readable medium 1506 may be a non-transitory or non-volatile medium, such as a magnetic disk or solid-state non-volatile memory, or a volatile medium such as RAM. The instructions or modules stored on the processor-readable medium 1506 may include machine-readable instructions 1564 executed by the processor(s) 1502 that cause the processor(s) •1502 to perform the methods and functions of the video translation system 100.

The video translation system 100 may be implemented as software stored on a non-transitory processor-readable medium and executed by the one or more processors 1502. For example, the processor-readable medium 1506 may store an operating system 1562, such as MAC OS, MS WINDOWS, UNIX, or LINUX, and code 1564 for the Video translation system 100. The operating system 1562 may be multi-user, multiprocessing, multitasking, multi-threading, real-time, and the like. For example, during runtime, the operating system 1562 is running and the code for the video translation system 100 is executed by the processor(s) 1502.

The computer system 1500 may include a data storage 1510, which may include non-volatile data storage. The data storage 1510 stores any data used by the Video translation system 100. The data storage 1510 may be used to store the input videos, the input and output audio tracks, the transcriptions, subtitles, output videos, and other data that is used or generated by the video translation system 100 during operation.

The network interface 1504 connects the computer system 1500 to internal systems for example, via a LAN. Also, the network interface 1504 may connect the computer system 1500 to the Internet. For example, computer system 1500 may connect to web browsers and other external applications and systems via the network interface 1504.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A video translation system, comprising:
at least one processor;
a non-transitory processor-readable medium storing machine-readable instructions that cause the at least one processor to:
identify a domain associated with an input video including an input audio track in a source language;
automatically select a translation engine from a plurality of translation engines and a transcription engine from a plurality of transcription engines based at least on the domain, wherein to automatically select the translation engine and the transcription engine, the at least one processor is configured to:
generate, using trained machine learning (ML) models, multiple solution paths based on the domain, wherein each of the multiple solution paths includes a unique combination of one of an optical character recognition (OCR) engine, one of the plurality of transcription engines and one of the plurality of translation engines;
score each of the multiple solution paths based on accuracy of each of the OCR engine, the transcription engine, and the translation engine used in the unique combination for the source language, a target language, and the domain; and
select the OCR engine, the transcription engine, and the translation engine from one of the solution paths having the highest score of the multiple solution paths;
produce a transcription of the input audio track in the source language by the transcription engine;
translate the transcription into the target language using the translation engine;
generate translated subtitles in the target language using the translated transcription,
wherein the translated subtitles also include translations for textual content displayed in the source language in the input video;
generate a voice output corresponding to the translated transcription of the input audio track;

produce an output audio track corresponding to the input audio track in the target language using the voice output; and
generate an output video that displays video content of the input video in synchrony with the output audio track and the translated subtitles.

2. The video translation system of claim 1, wherein to identify the domain the at least one processor is to:
extract keywords from the input audio track; and
create a probability scorecard against a plurality of predefined domains using Naïve Bayes method.

3. The video translation system of claim 2, wherein to identify the domain the at least one processor is to:
output one of the plurality of predefined domains with a highest probability as the domain of the input video.

4. The video translation system of claim 1, wherein to generate the translated subtitles, the at least one processor is to:
extract text from the input video using optical character recognition (OCR) techniques; and
translate into the target language, the transcription of the input audio track, and the text extracted from the input video.

5. The video translation system of claim 4, wherein to extract the text from the input video, the at least one processor is to further:
detect frames of the input video with textual content using contour detection techniques;
identify a subset of the frames having more than a predetermined area of textual content as including meaningful text; and
deduplicate the subset of the frames including the meaningful text.

6. The video translation system of claim 5, wherein to identify the meaningful text from the input video, the at least one processor is to further:
for each of the frames including the textual content:
generate an ordered sequence of features using a trained convolution neural network (CNN);
identify an area of the frame including the textual content based on the ordered sequence of features;
predict letters of the textual content using a source language based-CNN trained to identify letters of the source language;
extract word features using a bi-directional Long Short Term Memory (LSTM) based on an output of the source language based-CNN;
calculate a percentage of textual features to non-textual features; and
determine that the frame includes the meaningful text based on a comparison of the percentage with a predefined threshold percentage.

7. The video translation system of claim 6, wherein to de-duplicate the frames the at least one processor is to:
extract respective feature vectors for two of the frames; and
measure a Euclidean distance between the respective feature vectors.

8. The video translation system of claim 7, wherein to de-duplicate the frames the at least one processor is to:
determine similarity between the two frames by applying a sigmoid function to the Euclidean distance; and
deduplicate the two frames by comparing the similarity with a predetermined similarity threshold.

9. The video translation system of claim 1, wherein to produce the output audio track, the at least one processor is to:
identify corresponding gender associated with different portions of the input audio track; and
generate the voice output based on the corresponding gender.

10. The video translation system of claim 1, wherein to generate the output video, the at least one processor is to:
compare a duration of the voice output corresponding to the translated transcription with a duration of the input audio track;
determine that the voice output is asynchronous with corresponding portions of the input video;
calculate a speed coefficient as a ratio of the duration of the input audio track divided by the duration of the voice output; and
manipulate one or more of the voice output and video frames of the input video based on a value of the speed coefficient.

11. The video translation system of claim 10, wherein to generate the output video, the at least one processor is to:
determine that the voice output has a shorter duration than the input audio track;
determine an increase to be achieved in a value of the speed coefficient; and
generate the output audio track by inserting pauses in the voice output before and after voice segments of the voice output, wherein pause durations are determined based on the increase in the value of the speed coefficient to be achieved.

12. The video translation system of claim 10, wherein to generate the output video, the at least one processor is to:
determine that the voice output has a longer duration than the input audio track;
determine a decrease to be achieved in a value of the speed coefficient; and
add video frames to video content of the input video based on the decrease in the value of the speed coefficient to be achieved.

13. The video translation system of claim 12, wherein to add the video frames to the input video, the at least one processor is to:
automatically generate new video frames using a Generative Adversarial Network (GAN) that includes a generator and a discriminator wherein the generator creates images for the video frames which are validated by the discriminator.

14. The video translation system of claim 13, wherein to automatically generate the new video frames, the at least one processor is to:
generate the new video frames based on a received ground truth pose of a speaker imaged in the video frames of the input video, wherein the new video frames include fake mouth shapes with the ground truth pose of the speaker.

15. A method comprising:
identifying a domain associated with an input video having an input audio track in a source language;
automatically selecting a translation engine from a plurality of translation engines and a transcription engine from a plurality of transcription engines based on the domain, wherein the automatically selecting comprising:
generating, using trained machine learning (ML) models, multiple solution paths based on the domain, wherein each of the multiple solution paths includes a unique combination of one of an optical character recognition (OCR) engine, one of the plurality of transcription engines and one of the plurality of translation engines;

scoring each of the multiple solution paths based on accuracy of each of the OCR engine, the transcription engine, and the translation engine used in the unique combination for the source language, a target language, and the domain; and selecting the OCR engine, the transcription engine, and the translation engine from one of the solution paths having the highest score of the multiple solution paths;

producing a transcription of the input audio track in the source language by the transcription engine;

translating the transcription into the target language using the translation engine;

generating a voice output corresponding to the translated transcription of the input audio track;

producing translated subtitles using the translated transcription,
wherein the translated subtitles also include translations for textual content displayed in the source language in the input video;

producing an output audio track in the target language from the voice output; and generating an output video that displays video content of the input video in synchrony with the output audio track and the translated subtitles.

16. The method of claim 15, wherein producing the output audio track further comprises:
detecting gender of voice segments of the input audio track using a custom Convolutional Neural Network (CNN) with a Long Short-Term Memory (LSTM) network trained on a dataset having audio samples of people of different genders speaking in different languages, different accents, different tones, and different styles.

17. The method of claim 16, wherein training the custom CNN with the LSTM network further includes:
training the custom CNN with the LSTM network for detecting the gender in the source language using language-specific features included in the dataset.

18. The method of claim 17, wherein training the custom CNN with the LSTM network further includes:
converting the audio samples into Mel-spectrograms;
shuffling, resizing, and normalizing the Mel-spectrograms; and
dividing the dataset into a training dataset, a validation dataset, and a testing dataset.

19. The method of claim 15, wherein producing the translated subtitles further comprises:
detecting stop words of the source language from the transcription; and
identifying starting and ending of sentences of the transcription using the stop words.

20. The method of claim 17, wherein producing the translated subtitles further comprises:
selecting a glossary based on the domain, the source language, and the target language, wherein the glossary includes domain-specific terminologies in one or more of the source language and the target language.

21. A non-transitory processor-readable storage medium comprising machine-readable instructions that cause a processor to:
identify a domain associated with an input video having an input audio track in a source language;

automatically select a translation engine from a plurality of translation engines and a transcription engine from a plurality of transcription engines based at least on the domain, wherein the automatically selecting comprising:
generate, using trained machine learning (ML) models, multiple solution paths based on the domain, wherein each of the multiple solution paths includes a unique combination of one of an optical character recognition (OCR) engine, one of the plurality of transcription engines and one of the plurality of translation engines;

score each of the multiple solution paths based on accuracy of each of the OCR engine, the transcription engine, and the translation engine used in the unique combination for the source language, a target language, and the domain; and select the OCR engine, the transcription engine, and the translation engine from one of the solution paths having the highest score of the multiple solution paths;

produce a transcription of the input audio track in the source language by the transcription engine;

translate the transcription into the target language using the translation engine; generate a voice output corresponding to the translated transcription of the input audio track;

generate translated subtitles in the target language using the translated transcription,
wherein the translated subtitles also include translations for textual content displayed in the source language in the input video;

produce an output audio track corresponding to the input audio track in the target language using the voice output; and generate an output video that displays video content of the input video in synchrony with the output audio track and the translated subtitles.

22. The non-transitory processor-readable storage medium of claim 21, wherein the instructions to generate the output video that cause the processor to:
determine that the voice output is asynchronous with the video content of the input video based on a comparison of duration of the voice output with the input audio track.

23. The non-transitory processor-readable storage medium of claim 22, wherein the instructions to generate the output video cause the processor to:
identify beginning and end of sentences in the voice output based on detection of stop words of the target language; and
generate the output audio track from the voice output by adding pauses at the beginning and end of the sentences in the voice output.

24. The non-transitory processor-readable storage medium of claim 22, wherein the instructions to generate the output video cause the processor to:
generate a new video frame using a generator network of a Generative Adversarial Network (GAN) by:
calculate edge descriptors of video frames that precede and succeed a frame corresponding to a current timestamp;
determine corresponding Euclidean distances between the preceding frames and the frame for the current timestamp as well as the succeeding video frames and the frame pertaining to the current timestamp;

identify as distinct frames, two of the preceding and succeeding frames that immediately precede and immediately succeed the frame corresponding to the current time stamp and having the corresponding Euclidean distances greater than a threshold value; and replace features in the frame corresponding to the current timestamp with features from the immediately preceding and immediately succeeding distinct frames.

25. The non-transitory processor-readable storage medium of claim 24, wherein the instructions to generate the output video that cause the processor to:

evaluate, using a discriminator network of the GAN, the new video frame for motion consistency.

* * * * *